United States Patent [19]

Shook et al.

[11] 4,172,825

[45] Oct. 30, 1979

[54] POLYMER/POLYOLS AND PROCESS FOR PRODUCTION THEREOF

[75] Inventors: Edgar G. Shook, South Charleston; Donald W. Simroth; Russell van Cleve, both of Charleston; Edmund C. Steinle, Jr., South Charleston, all of W. Va.

[73] Assignee: Union Carbide Corporation, New York, N.Y.

[21] Appl. No.: 941,690

[22] Filed: Sep. 12, 1978

Related U.S. Application Data

[63] Continuation-in-part of Ser. No. 594,649, Jul. 10, 1975, abandoned.

[51] Int. Cl.$^2$ .................. C08K 5/06; C08G 18/14; C08G 18/63
[52] U.S. Cl. .................. 260/33.2 R; 528/75; 521/137
[58] Field of Search .................. 260/33.2 R; 521/137; 528/75

[56] References Cited

U.S. PATENT DOCUMENTS

| | | | |
|---|---|---|---|
| 3,418,354 | 12/1968 | Wheeler | 260/448.2 |
| 3,652,639 | 3/1972 | Pizzini et al. | 260/75 NN |
| 3,823,201 | 7/1974 | Pizzini et al. | 260/33.4 R |
| 3,953,393 | 4/1976 | Ramlow et al. | 260/33.2 R |

FOREIGN PATENT DOCUMENTS

| | | | |
|---|---|---|---|
| 788115 | 2/1973 | Belgium | 260/33.4 R |
| 818680 | 10/1975 | Belgium. | |
| 785835 | 5/1968 | Canada. | |
| 1321679 | 6/1973 | United Kingdom. | |

OTHER PUBLICATIONS

Du Pont Product Information–VAZO 64, E. I. Du Pont de Nemours & Co. (Inc.), Wilmington, Del., (1969).
Lee and Sears–Thermodynamics, Addison-Wesley, (Reading, Mass.), 1955, pp. 35–49.

*Primary Examiner*—H. S. Cockeram
*Attorney, Agent, or Firm*—Eugene C. Trautlein

[57] ABSTRACT

This invention relates to a novel process for producing polymer/polyols characterized by the use of specific combinations of acrylonitrile and styrene and by utilizing certain peroxyester catalysts. Methacrylonitrile and/or alpha-methyl styrene may optionally be used as substitutes for the acrylonitrile and styrene, respectively. The process produces novel polymer/polyols characterized by relatively high polymer contents and increased stability. These polymer/polyols are stable, fluid, essentially free from scrap and seeds as produced and contain relatively small polymer particles such that, in the preferred embodiment, essentially all are less than about 30 microns in diameter.

28 Claims, 17 Drawing Figures

100/0 ACRYLONITRILE/STYRENE RATIO

90/10 ACRYLONITRILE/STYRENE RATIO

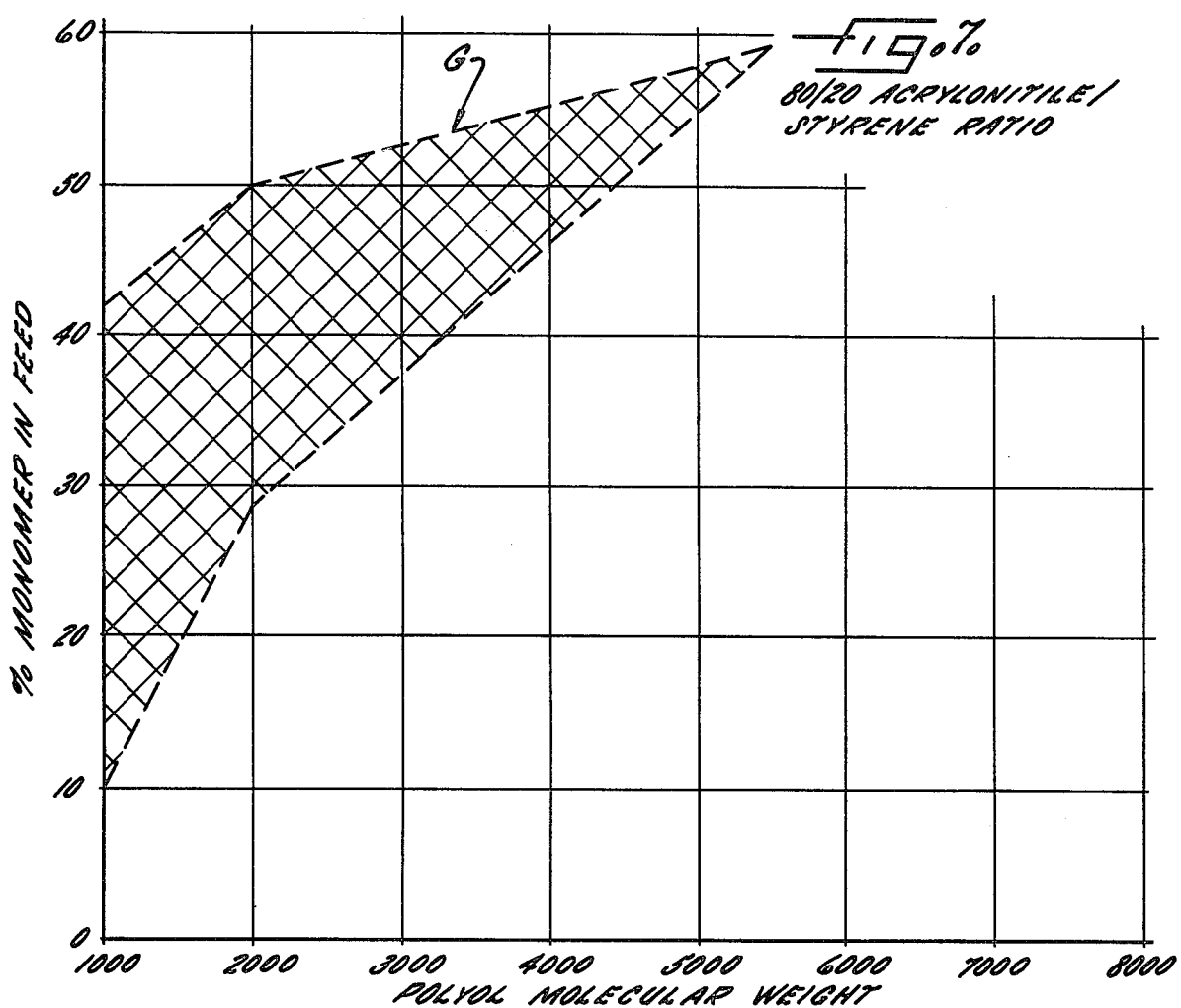
FIG. 9. 80/20 ACRYLONITRILE/STYRENE RATIO
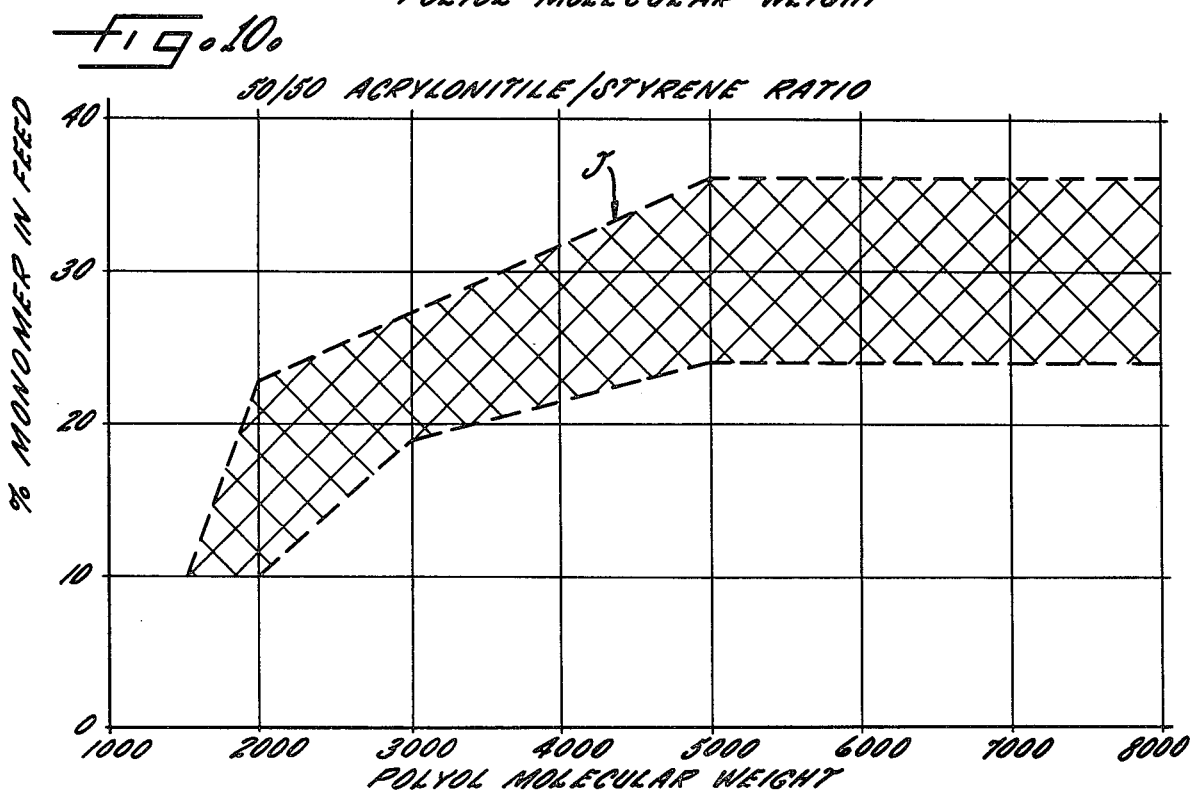
FIG. 10. 50/50 ACRYLONITRILE/STYRENE RATIO

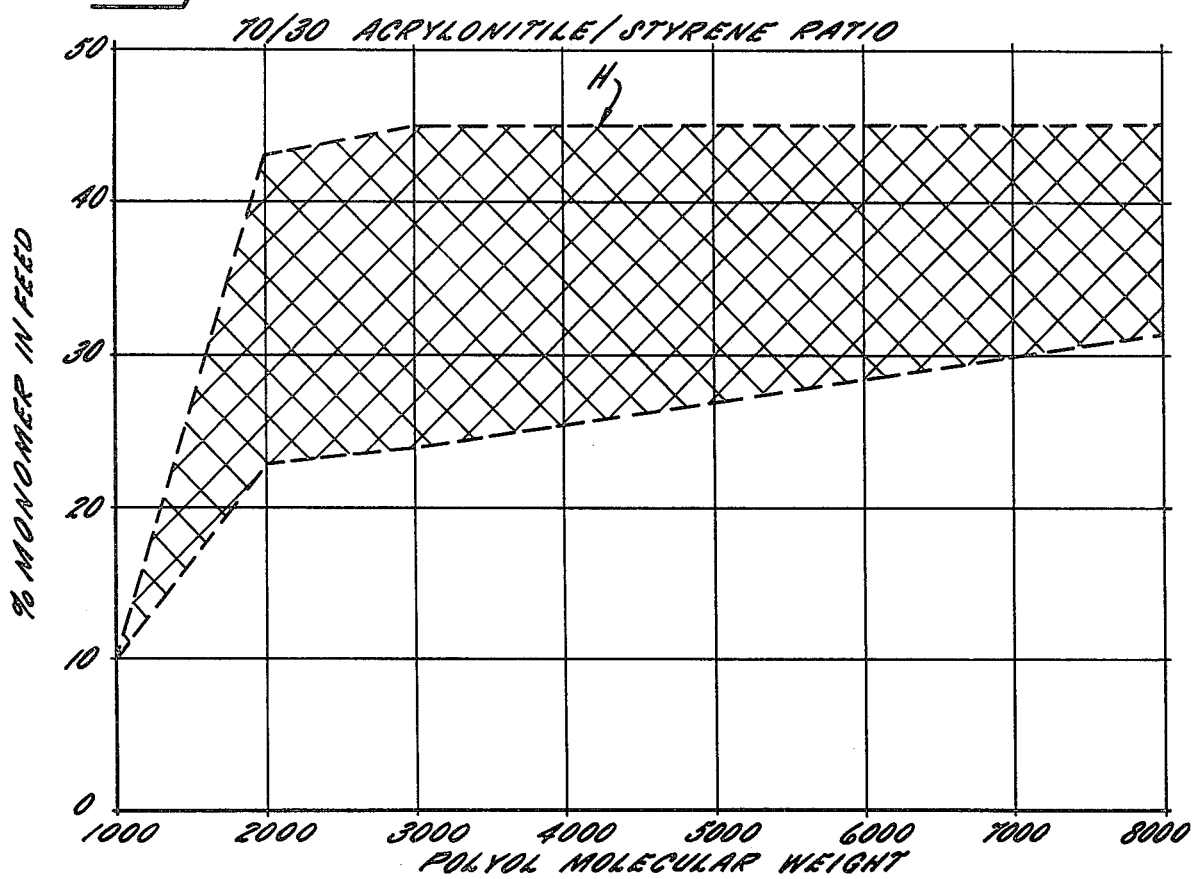
Fig. 8. 70/30 ACRYLONITILE/STYRENE RATIO
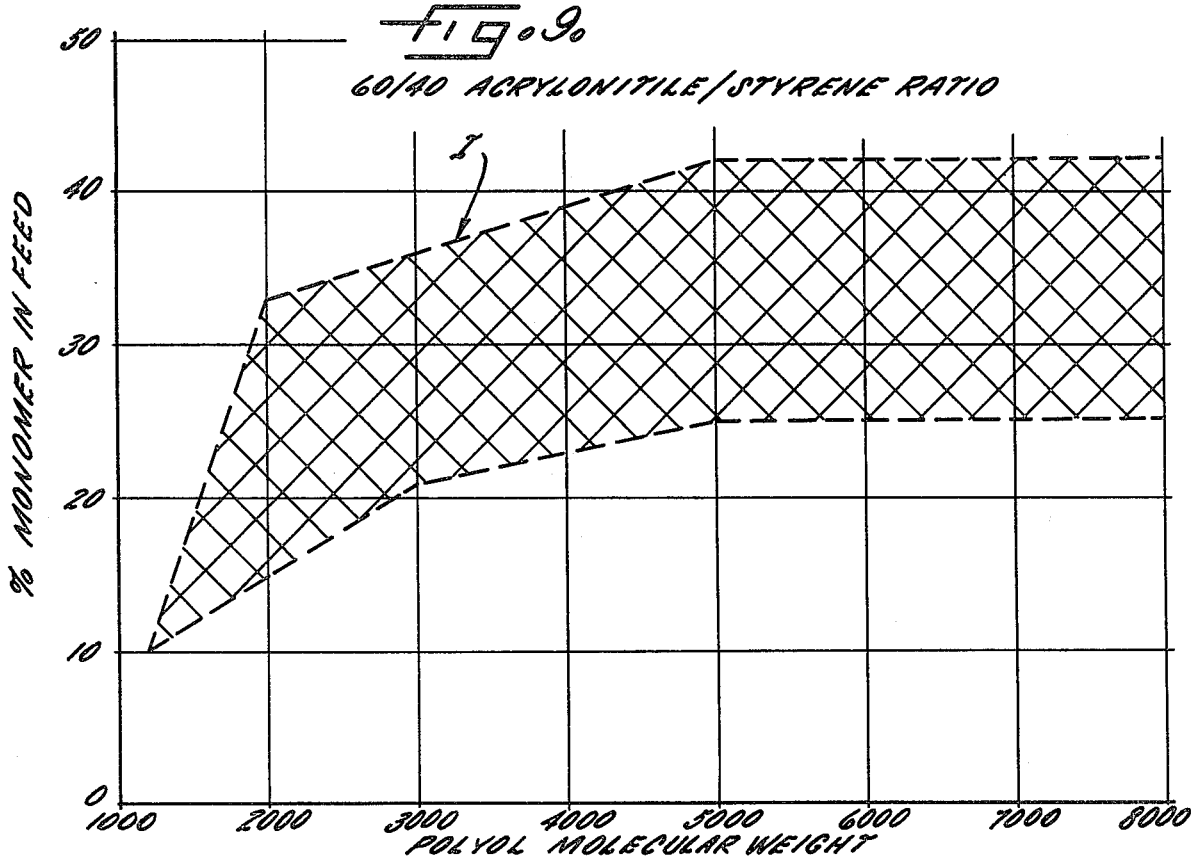
Fig. 9. 60/40 ACRYLONITILE/STYRENE RATIO

POLYMER/POLYOLS AND PROCESS FOR PRODUCTION THEREOF

RELATED APPLICATIONS

This application is a continuation-in-part of Ser. No. 594,649, filed July 10, 1975, and now abandoned.

Priest, Ser. No. 417,487, filed: Nov. 20, 1973, for: Polymer/Polyols and Process for Production Thereof, a continuation-in-part of Ser. No. 176,317, filed Aug. 30, 1971 (now abandoned).

Simroth, Ser. No. 593,164, filed July 3, 1975, for: Polymer/Polyols and Process for Production Thereof, a continuation-in-part of Ser. No. 501,362, filed Aug. 28, 1974 (now abandoned).

BACKGROUND OF THE INVENTION

Polymer/polyol compositions suitable for use in producing polyurethane foams, elastomers and the like are known materials. Such compositions can be produced by polymerizing one or more olefinically unsaturated monomer dissolved or dispersed in a polyol in the presence of a free radical catalyst. These polymer/polyol compositions have the valuable property of imparting to, for example, polyurethane foams produced therefrom, higher load-bearing properties than are imparted by unmodified polyols.

The polymer/polyol compositions that found initial commercial acceptance were primarily compositions produced from polyols and acrylonitrile. Such compositions were somewhat higher in viscosity than desired in some applications. Further, such compositions were primarily used commercially in producing foams under conditions such that the heat generated during foaming was readily dissipated (e.g.—the foams were of relatively thin cross-section) or under conditions such that relatively little heat was generated during foaming. When polyurethane foams were produced under conditions such that the heat generated during foaming was not readily dissipated, severe foam scorching usually resulted. Later, polymer/polyol compositions produced from acrylonitrile-methymethacrylate mixtures were commercialized and were convertible to polyurethane foams having reduced scorch.

More recently, polymer/polyol compositions produced from polyols and acrylonitrile-styrene mixtures have been used commercially. The copending Priest application identified herein provides an improved (semi-batch or continuous) process for forming such polymer/polyols which include, in general, maintaining a low monomer concentration throughout the reaction mixture during the process. The Priest polymer/polyols produced have low viscosities. In addition, the Priest polymer/polyols can be converted to low density, water-blown polyurethane foams having reduced scorch, especially at relatively low acrylonitrile to styrene ratios.

Among the known commercial polymer/polyol compositions produced from acrylonitrile-styrene mixtures is a composition consisting essentially of about 77.5 weight percent of a polol having a molecular weight of about 5600 and about 22.5 weight percent of an acrylonitrile/styrene polymer wherein the acrylonitrile/styrene weight ratio is about 40/60 and having a filterability (as defined below) from 7 to 52 percent. Another such composition consists essentially of about 79.1 weight percent polyol having a molecular weight of about 3400 and about 20.9 weight percent of an acrylonitrile/styrene polymer wherein the acrylonitrile/styrene weight ratio is about 47/53 and having a filterability of 100 percent. Filterabilities of at least 20 percent indicate adequate stability for some applicatons. These compositions are apparently produced by a semi-batch process using azodiisobutyronitrile as a catalyst and a polyol made employing, inter alia, an allegedly critical source of added unsaturation as disclosed in U.S. Pat. No. 3,823,201. The latter patent does not disclose the filterability of its polymer/polyol compositions. Semi-batch processes, such as those of U.S. Pat. No. 3,823,201, are less desirable for large-scale commercial production than are continuous processes. On the other hand, difficulties are encountered in producing highly stable polymer/polyol compositions continuously from acrylonitrile/styrene mixtures using azodiisobutyronitrile as a catalyst as disclosed in the copending Priest application under some conditions (e.g., using relatively low molecular weight polyols).

The copending Simroth application which has been identified discloses additional and substantial improvements in forming polymer/polyols. This allows the optimization of the polymer content and the usable monomer ratios for a given polyol in providing satisfactory stable polymer/polyols.

Despite these improvements, and while polymer/polyol compositions can be produced from widely varying polymer contents and monomer mixtures using azo-type catalyst such as were generally used in producing the above-mentioned polymer polyols, practical quality control restrictions such as stability (as shown, for example, by filterability) have resulted in commercial limitations insofar as the usable maximum styrene content, the maximum polymer content and the minimum molecular weight for the polyol are concerned.

Some patents in the polymer/polyol field disclose the interchangeable use of azo and peroxide catalysts. Thus, for example, among several catalysts set forth, the copending Priest application lists the half-life for t-butylperoxypivalate and t-butylperoxybutyrate. No examples using such catalysts are, however, included. U.S. Pat. No. 3,418,354 discloses polymerizing monomers in polyols using peroxide catalyst containing a peroxide group linked to a tertiary carbon atom (e.g., ditertiary butyl peroxide) but discloses no specific peroxyester catalyst. Indeed, the only specific "example" of a process for forming a polymer/polyol which utilizes a peroxyester, peroxide-type catalyst of which applicants are aware is shown in Great Britain Pat. No. 1,321,679 which discloses in the specification a continuous process for forming an 80/20 acrylonitrile/styrene polymer/polyol having 40 weight percent polymer with a polyether polyol having a molecular weight of 4,000 and a catalyst of azodiisobutyronitrile or tertiary butyl peroctoate. However, in all the working Examples, including one corresponding to this process, an azo catalyst was used.

The use of azo-type catalysts presents processing difficulties due to the solid nature of the catalysts. Also, a toxic, by-product residue is formed. And, as has been described herein, there are limitations which restrict in a practical, commercial sense the polymer/polyol compositions which can be provided.

It has been theorized that the stability of polymer/polyols requires the presence of a minor amount of a graft copolymer formed from the polymer and polyol. And, a number of literature references have observed large differences in grafting efficiency between the use of peroxides such as benzoyl peroxide and azobisisobutyronitrile in certain monomer-polymer systems while others have noted to marked differences.

In the *Journal of Cellular Plastics*, March, 1966, entitled "Polymer/Polyols; A New Class of Polyurethane Intermediates" by Kuryla et al, there is reported a series of precipitation experiments run to determine any marked differences in the polymer/polyols produced by either benzoyl peroxide or azobis-isobutyronitrile when used as the initiators in the in situ polymerization of acrylonitrile in a propylene oxide trial having a theoretical number average molecular weight of about 3000. The data indicated no significant differences between the polymers isolated and no marked "initiator effect" was observed.

Indeed, it was reported that the azo catalyzed polymer/polyols were found to be much more reactive, and processed better in the making of urethane flexible foams, than those polymer/polyols which were made using a peroxide catalyst. It was observed that apparently residual peroxides remaining in the refined polymer/polyol "poison" the foaming catalysts.

Accordingly, despite the handling difficulties associated with using azo-type catalysts as has been described herein, virtually all of the commercial polymer/polyol compositions have been produced using this type of catalyst. There has been no recognition in the polymer/polyol field that any superior results could be achieved using a peroxide-type catalyst.

Polymer/polyols have been commercially accepted mostly for various molding applications. However, there has been less acceptance in other applications such as slab stock foam where scorch is a problem, reducing the scorch necessitating the use of acrylonitrile/styrene polymer/polyols with low acrylonitrile/styrene ratio.

In producing polymer/polyols for use in certain polyurethane elastomer applications relatively low molecular weight polyols are typically utilized to provide the requisite product stiffness. However, it is difficult to make satisfactorily stable polymer/polyols from such polyols.

Still other applications could desirably utilize polyurethane foams with even higher load-bearing capacities than can be currently provided using available polymer/polyols.

OBJECTS

It is an object of the present invention to provide a process for producing polymer/polyol compositions in which the commercially critical process parameters can be broadened.

A further object provides a process for producing polymer/polyol compositions which allows the production on a commercial scale of polymer/polyols under conditions which would prevent the commercial production using previously used catalysts.

A still further object lies in the provision of polymer/polyol compositions which have commercially acceptable low scrap, filterable solids and no settling tendency properties.

Yet another and more specific object of this invention is to provide polymer/polyol compositions which can be used to produce low density, water-blown polyurethane foams in areas such as slab foam stock which require the absence of any significant scorch or off-color and in which polyester polyols have previously been used almost exclusively.

A further and specific object provides polymer/polyol compositions which are formed from sufficiently low molecular weight polyols as to allow the formation of elastomers with the requisite stiffness.

Yet another specific object lies in the provision of polymer/polyol compositions capable of forming polyurethane products with enhanced load-bearing characteristics.

Other objects and advantages of the present invention will become apparent in the following description and in the accompanying figures, in which:

DESCRIPTION OF THE FIGURES

FIGS. 5 through 12 are graphs of the monomer content versus the molecular weight of the polyol for acrylonitrile/styrene monomer ratios ranging from all acrylonitrile to 30/70 and illustrating the preferred polymer/polyol compositions which can be achieved using the present invention which cannot be formed using an azo catalyst, (at least when the continuous process described herein is employed)

SUMMARY OF THE INVENTION

Figure 1:
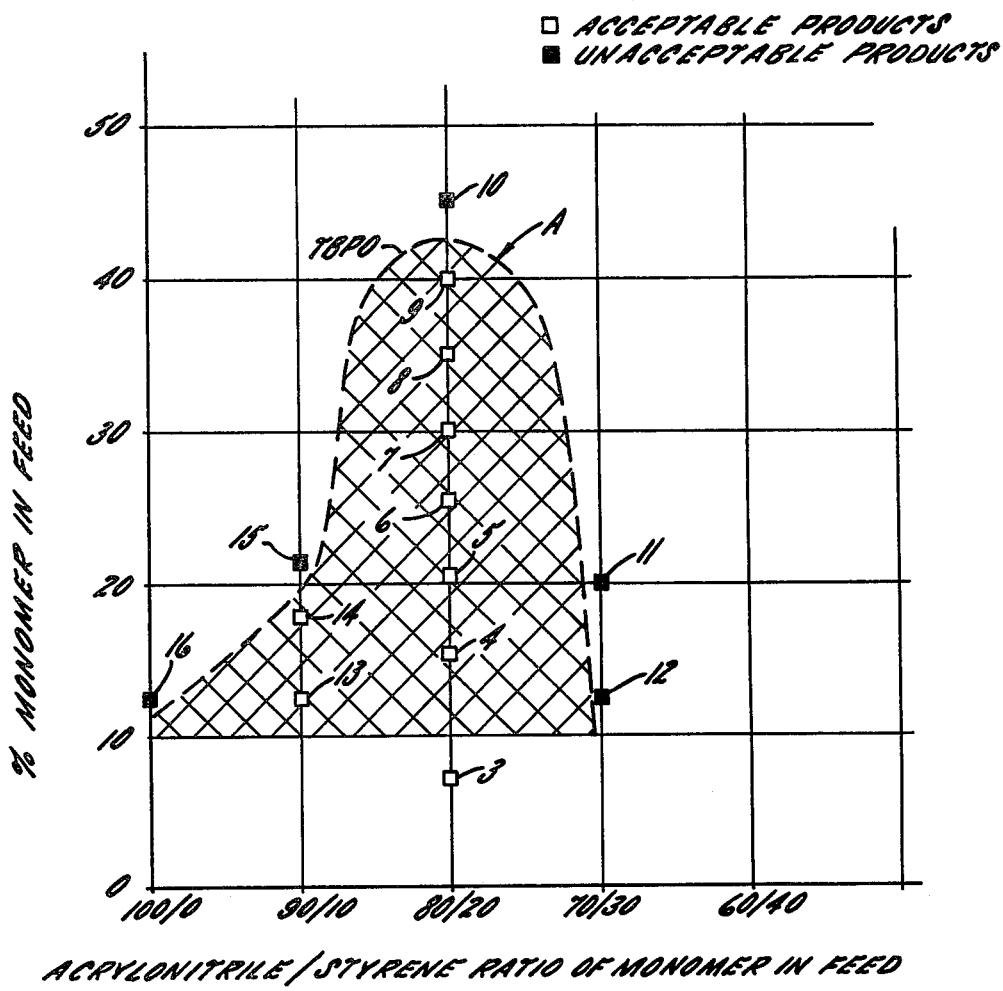
FIG. 1 depicts a graph of the percent monomer in the feed versus the acrylonitrile/styrene ratio of the monomer in the feed and illustrates the preferred polymer/polyol compositions which can be formed when using a polyol (identified as Polyol I) having a theoretical number average molecular weight of about 1,000.

In general, the present invention is predicated on the discovery that polymer/polyol compositions exhibiting outstanding properties for various commercial applications can be made by utilizing, in the formation of the polymer/polyols, a specific type of peroxide catalyst, namely t-alkyl peroxyester catalysts. More specifically, the usable catalysts can be characterized by the following formulas:

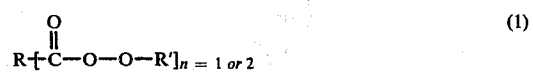

wherein R' represents an alkyl group typically having from 4 to 20 carbon atoms, preferably 4 to 8, and the carbon atom or atoms adjacent the oxygen bond are tertiary, and R constitutes an alkyl group typically having from 3 to 12 carbon atoms or an aromatic group. The aliphatic diperesters as described in U.S. Pat. No. 3,264,274 may also be employed as can aryl peresters as shown in U.S. Pat. No. 2,567,615. By the utilization of this specific type of catalyst, polymer/polyols can be produced on a commercial basis with outstanding properties such as filterability in processing yet which can relax the specific parameters that have been previously used so that either the polymer or the styrene content can be increased. Also, polymer/polyols on a commercial scale with outstanding properties can be produced with polyols having a molecular weight lower than have been heretofore used.

This invention provides liquid polymer-polyol compositions selected from the group consisting of:

A. a liquid polymer/polyol composition consisting essentially of: (1) from 40 to 90 weight percent of a polyoxypropylene polyol having a molecular weight from 1000 to 3000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, B. a liquid polymer/polyol composition consisting essentially of: (1) from 40 to 90 weight percent of a polyoxypropylene polyol having a molecular weight of at least 5000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17; and C. a liquid polymer/polyol composition consisting essentially of: (1) from 40 to 90 weight percent of a polyoxypropylene polyol having a molecular weight of at least 2000 and (2) from 60 to 10 weight percent of an acrylonitrile/styrene polymer wherein the acrylonitrile/styrene weight ratio is from 70/30 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the ewight percent of the monomer mixture (based on weights of the monomer mixture and the polyol) and acrylonitrile/styrene ratio in the monomer mixture being such as to fall in a volume, said volume being characterized by areas A through Q of FIGS. 1 through 17.

The novel compositions are distinct from prior art compositions in that the novel compositions are produced using a t-alkyl peroxide catalyst and/or, in a specific embodiment, are produced from polyols consisting of the propylene oxide or propylene oxide and ethylene oxide adducts of polyhydroxyalkanes.

DETAILED DESCRIPTION

In general, the ratio of acrylonitrile to styrene can suitably range from about 100/0 to about 20/80, and the monomer content in the feed can comprise up to about 60 percent by weight of the polymer/polyol. The ratio of acrylonitrile to styrene monomer in the feed that may be employed to form polymer/polyol compositions according to the present invention will depend upon the specific polyol being used and the proportion of the monomer in the feed. The greatest latitude is achieved with the highest molecular weight polyols; and the breadth of the usable acrylonitrile/styrene ratio for a given polyol will, in turn, depend upon the level of the polymer content. Generally, as the polymer content increases, the usable acrylonitrile/styrene range will become narrower. The maximum polymer content (or monomer content in the feed) for any given polyol and acrylonitrile/styrene ratio is that polymer content (or monomer content) above which the resulting product will not pass the requisite filtration test as will be described in detail hereinafter. The actual polymer content and the acrylonitrile/styrene ratio that are used will, of course, be dependent to a large extent on the requirements needed for the intended end use application. As an example, when the polymer/polyol compositions are to be used for forming scorch-free, slab stock foam, it is preferred that the styrene monomer content be at least equal to the acrylonitrile content and, more preferably the acrylonitrile/styrene ratio should be between about 45/55 to 30/70.

While the present invention is directed to the use of an acrylonitrile/styrene monomer system, it should be appreciated that minor amounts of an additional monomer or monomers may be employed. However, in such event, the relative amount of acrylonitrile and styrene should remain within the limits previously set forth herein.

By way of illustration, the following inter-relationships apply to polyols having theoretical number average molecular weights of 5,000, 3,000, 2,000 and 1,000 respectively.

A. For a glycerol-started triol consisting of 86 weight percent oxypropylene groups and 14 weight percent oxyethylene groups and having a molecular weight of about 5,000, the usable acrylonitrile to styrene weight ratio may vary between about 100:0 and 30:70 when the polymer content is no higher than about 18 weight percent with a preferred monomer range of 100:0 to 40:60. With no more than 25 weight percent polymer, the usable acrylonitrile to styrene range with such a triol is between 100:0 and 36:64 with a preferred range of 90:10 to 45:55. Employing no more than 35 weight percent polymer, the usable acrylonitrile to styrene range is between 88:12 and 47:53. With no more than 45 weight percent polymer, the usable acrylonitrile to styrene range is between 87:13 and 71:29. At an acrylonitrile to styrene weight ratio of 80:20, a polymer/polyol can be made as high as 50 percent polymer or above with this triol.

B. For a glycerol-started triol consisting of oxypropylene groups and having a molecular weight of about 1,000, the acrylonitrile to styrene weight ratio may vary between about 100:0 and 30:70 for polymer content of up to about 20 weight percent with a preferred range of 100:0 to 40:60. With no more than 30 weight percent polymer, the usable acrylonitrile to styrene range is between 90:10 and 53:47. Employing no more than 40 weight percent polymer, the usable acrylonitrile to styrene range is between 88:12 and 65:35. At an acrylonitrile to styrene weight ratio of 80:20, a polymer/polyol can be made as high as about 50 percent polymer with this triol.

C. For a dipropylene glycol-started diol consisting of oxypropylene groups and having a molecular weight of about 2,000, the acrylonitrile to styrene weight ratio may vary between about 100:0 and 35:65 for a polymer content of up to about 20 percent with a preferred range of 100:0 to 45:55. With no more than 30 weight percent polymer, the usable acrylonitrile to styrene range is between 88:12 and 57:43 with a preferred range of 85:15 to 60:40. At an acrylonitrile to styrene ratio of 80:20, a polymer/polyol can be made as high as about 50 weight percent polymer when using such a diol.

D. For a dipropylene glycol started diol consisting of oxypropylene groups and having a molecular weight of about 1,000, the acrylonitrile to styrene weight ratio may vary between 100:0 and 71:29 for a polymer content up to about 10 percent. Employing no more than 20 weight percent polymer, the usable acrylonitrile to styrene range is between 90:10 and 72:28. At an acrylonitrile to styrene weight ratio of 80:20, a polymer/polyol can be made as high as about 40 weight percent polymer with this diol.

As substitutes for either acrylonitrile or styrene, methacrylonitrile and/or alpha-methyl styrene, respectively, may be used although such use is not preferred. It should be appreciated that, in the event of a substitution, the usable monomer ratios and polymer contents may vary somewhat.

With respect to the polyol constituent, this comprises poly(oxypropylene)glycols, triols and higher functionality polyols. Such polyols include poly(oxypropylene-oxyethylene)polyols; however, desirably, the oxyethylene content should comprise less than 50 percent of the total. The ethylene oxide can be incorporated in any fashion along the polymer chain. Stated another way, the ethylene oxide can be either incorporated in internal blocks, as terminal blocks, or may be randomly distributed along the polymer chain. As is well known in the art, the preferred polyols herein do contain varying amounts of unsaturation. The extent of unsaturation does not affect in any adverse way the formation of the polymer/polyols in accordance with the present invention.

For the purposes of this invention, the polyol should have a number average molecular weight of about 1,000 or greater, the number average being used herein being the theoretical value. The true number average molecular weight may be somewhat less, depending upon the extent to which the true molecular functionality is below the starting or theoretical functionality. It should be appreciated that the stability of the polymer/polyol compositions decreases with decreasing molecular weight of the polyol employed. However, in accordance with the present invention, even when a polyol with a molecular weight of 1,000 has been used, the shelf life in terms of settling tendencies may be as much as at least about three months or more.

The polyols employed can have hydroxyl numbers which vary over a wide range. In general, the hydroxyl numbers of the polyols employed in the invention can range from about 20 and lower, to about 150 and higher. The hydroxyl number is defined as the number of milligrams of potassium hydroxide required for the complete hydrolysis of the fully acetylated derivative prepared from 1 gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = molecular weight of the polyol.

The exact polyol employed depends upon the end-use of the polyurethane product to be produced. The molecular weight or the hydroxyl number is selected properly to result in flexible or semiflexible foams or elastomers when the polymer/polyol produced from the polyol is converted to a polyurethane. The polyols preferably possess a hydroxyl number of from about 50 to about 150 for semiflexible foams and from about 20 to about 70 for flexible foams. Such limits are not intended to be restrictive, but are merely illustrative of the large number of possible combinations of the above polyol coreactants.

While not preferred, any other type of known polyols may also be used. Among the polyols which can be employed are one or more polyols from the following class of compositions, known to those skilled in the polyurethane art:

(a) Alkylene oxide adducts of non-reducing sugars and sugar derivatives;

(b) alkylene oxide adducts of phosphorus and polyphosphorus acids;

(c) Alkylene oxide adducts thereof of polyphenols;

(d) The polyols from natural oils such as castor oil, and the like.

(e) alkylene oxide adducts of polyhydroxyalkanes other than those already described herein.

Illustrative alkylene oxide adducts of polyhydroxyalkanes include, among others, the alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins; condensation products of various phenolic compounds and acrolein; the simplest member of this class being 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

It should be appreciated that blends or mixtures of various useful polyols may be used if desired. With polyols other than the preferred type, the useful monomer contents and acrylonitrile/styrene ratio may vary somewhat.

In accordance with the present invention, the free radical catalyst employed in the present invention comprises a t-alkyl peroxyester as previously described herein. Useful catalysts must have a satisfactory half-life within the temperature ranges used in forming the polymer/polyol compositions, i.e.—the half-life should preferably be about 25 percent or less of the residence time in the reactor at a given temperature with half-lives which are unduly long at the use temperature, an excessive amount of catalyst would be required to obtain an acceptable reaction rate which would in turn result in large amounts of undecomposed catalyst being left in the product. This excess peroxide would lead to development of odor in the product and also be harmful during the subsequent polyurethane foaming reaction. Desirably, the catalysts used should provide a polymer/polyol with as low an acid number as possible, preferably less than about 0.5. Still further, useful catalysts should be liquid and not be unduly sensitive to shock.

Representative examples of useful catalyst species include t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate. It is particularly preferred to utilize t-butyl-peroxy-2-ethylhexanoate inasmuch as this species can be safely stored as a blend in a diluent at a temperature of about 65° F., for example, when stored as a 50 weight percent blend with dioctylphthalate, as compared with the lower temperatures required for other species, (e.g. −30° F.), and results in polymer/polyol compositions having acid numbers only slightly higher than compositions formed from an azo catalyst.

The catalyst concentration is not critical and can be varied within wide limits. As a representative range, the concentration can vary from about 0.1 to about 1.0 weight percent, based upon the total feed to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

It should be appreciated that, while the present invention is directed to the formation of polymer/polyol compositions utilizing the described peroxyester catalysts, certain amounts of other types of free radical catalysts such as an azo catalyst may also be incorporated with the peroxyester catalyst being utilized. Of course, the amount of the peroxyester catalyst used should be sufficient to allow production of polymer/polyol compositions in accordance with the present invention.

The polymer/polyols of the present invention are produced by utilizing the process set forth in the copending Priest application, identified herein. In accordance with that process, a low monomer to polyol ratio is maintained throughout the reaction mixture during the process. This is achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. Semi-Batch operation usually permits wider latitude in compositional parameters (e.g., a greater weight cent polymer) for a given degree of product stability than does continuous operation.

The polymerization can also be carried out with an inert organic solvent present that does not dissolve the polymer. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the solvent and the polyol is that they do not interfere with the monomer's polymerization reaction. When an inert organic solvent is used, it is generally removed from the reaction mixture by conventional means before the polymer/polyol is used to produce polyurethane foams.

The temperature range is not critical and may vary from about 100° C. to about 150° C. or perhaps greater, the preferred range being from 115° C. to 135° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those attained using a back mixed reactor (e.g.—a stirred flask or stirred autoclave). Reactors of this type keep the reaction mixture relatively homogeneous and so prevent localized high monomer to polyol ratios such as occur in certain tubular reactors, (e.g.—in the first stages of "Marco" reactors when such reactors are operated with all the monomer added to the first stage).

The process of this invention produces polymer/polyol compositions which are characterized by relatively high polymer contents, small particle size, freedom from scrap and seeds and convertibility to useful high modulus polyurethane elastomers and foams. More particularly, with a given polyol, the present invention allows the ratio of styrene to acrylonitrile, or the polymer content, to be increased, yet still providing stable products. Also, stable polymer/polyols may be made with lower molecular weight polyols than can be accomplished by prior processes.

The polymer/polyols of the present invention comprise dispersions in which the polymer particles (the same being either individual particles or agglomerates of individual particles) are relatively small in size and, in the preferred embodiment are all essentially less than 30 microns. Thus, in the preferred embodiment, essentially all of the product (viz.—about 99 percent or more) will pass through the filter employed in the filtration test that will be described in conjunction with the Examples. This insures that the polymer/polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filter. Some applications may also find useful products in which only about 20 percent passes through. Accordingly, the polymer/polyols of the present invention contemplate products in which at least 20 percent pass through the filter, preferably at least 50 percent, and most preferably essentially all.

The polymer/polyols formed pursuant to this invention may also be distinguished by the characteristic ester odor and by the substantial freedom from trace amounts of the tetramethylsuccinonitrile formed as a residue when an azo catalyst is used. By "substantial freedom" it is meant that the resulting polymer/polyol will contain less than the typical level of this toxic residue present when solely an azo catalyst is used. No residue will be present when only a peroxyester catalyst is used but trace amounts will be present when small amounts of an azo catalyst is used with the peroxyester catalyst employed in this invention.

With respect to the preferred polymer/polyol compositions within the scope of the present invention, the usable monomer contents, polyol molecular weights and acrylonitrile/styrene monomer ratios can be determined from the figures. In each figure, the preferred compositions achievable with the present invention but not by using an azo catalyst have been cross-hatched and lettered.

More particularly, the preferred polymer/polyol compositions of this invention are defined by a volume in which the three dimensions comprise monomer content, polyol molecular weight and acrylonitrile/styrene monomer ratio. The individual figures represent various cross-sections taken through this volume in each of the three dimensions.

The determination of whether a particular polymer/polyol composition is within the present invention is easily determined in those situations wherein any one of the three parameters corresponds to any one of the preselected parameters set forth in the figures. Thus, for example, when the polyol molecular weight is 2,000, the usable combinations of monomer content and acrylonitrile/styrene monomer ratio are shown by Area B of FIG. 2. As a further example, if the acrylonitrile/styrene monomer ratio is 40/60, the usable polyol molecular weights and monomer content are defined by Area K of FIG. 11.

In those situations wherein none of the three parameters correspond to any one of the preselected parameters set forth in the figures, the usable parameters are determined by coordination of any two of the figures having the closest parameters and with linear interpolation between such figures. Thus, for example, with a polyol molecular weight of 2,500 and an acrylonitrile/styrene monomer ratio of 75/25, the usable monomer contents can be determined by a comparison of FIGS. 7 and 8, directed to the useful parameters wherein the acrylonitrile/styrene ratios are 80/20 and 70/30 respectively. From FIG. 7, the usable monomer contents range from about 33 to 51 weight percent while FIG. 8 shows usable monomer contents of from about 23 to 44 weight percent. By interpolation, the usable monomer contents for a polymer/polyol composition within the preferred embodiment of the present invention range from about 28 to 48 weight percent. Essentially the same result is obtained by comparing FIGS. 2 and 3, directed to polyols wherein the preselected molecular weights are 2,000 and 3,000 respectively. In cases wherein an interpolation must be made, it is preferred to utilize those figures which minimize the interpolation required.

The present invention also provides a method for producing polyurethane products by reacting: (a) a polymer/polyol composition of this invention, (b) an organic polyisocyanate, and (c) a catalyst for the reaction of (a) and (b) to produce the polyurethane product, and, when a foam is being prepared, a blowing agent and a foam stabilizer. The reaction and foaming operations can be performed in any suitable manner, preferably by the one-shot technique.

The organic polyisocyanates that are useful in producing polyurethane products in accordance with this invention are organic compounds that contain at least two isocyanato groups. Such compounds are well known in the art. Suitable organic polyisocyanates include the hydrocarbon diisocyanates, (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane bis(isocyanatohexyl)sulfide, 1,4-diisocyanatobenzene, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene and mixtures thereof.

The catalysts that are useful in producing polyurethanes in accordance with this invention include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetyl-acetoneimine, bis-acetylacetonealkylene-diimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltinbis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

When the product being formed is a polyurethane foam, this may be accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. The anti-scorch properties of the foams produced using polymer/polyol compositions are most evident when at least some of the blowing agent is water and the water is used in an amount that results in a foam having a density less than 1.75 pounds per cubic foot. Generally, the use of water in an amount of at least 3.0 percent by weight based on the total weight of the polymer/polyol composition results in a foam having a density of less than 1.75 pounds per cubic foot.

It is also within the scope of the invention to employ small amounts, e.g., about 0.001 percent to 5.0 percent by weight, based on the total reaction mixture, of a foam stabilizer such as a "hydrolyzable" polysiloxanepolyoxyalkylene block copolymer such as the block copolymers described in U.S. Pat. Nos. 2,834,748 and 2,917,480. Another useful class of foam stabilizers are the "non-hydrolyzable" polysiloxane-polyoxalkylene block copolymers such as the block copolymers described in U.S. Pat. No. 3,505,377; U.S. patent application Ser. No. 888,067, filed Dec. 24, 1969 and British patent specification No. 1,220,471. The latter class of copolymers differs from the above-mentioned polysiloxane-polyoxyalkylene block copolymers in that the polysiloxane moiety is bonded to polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polyxiloxane polymer with the remainder being polyoxyalkylene polymer.

The polyurethanes produced in accordance with this invention may be advantageously employed in various applications. For example, the present invention allows the production of polyurethane foams from polymer/polyols in which the polymer composition contains less than about 50 percent by weight acrylonitrile. Such foams may be desirably employed in the slab foam market where the cross-sections are relatively large and where a relatively large exotherm is employed. in such situations, polyurethane foams produced in accordance with this invention result in essentially white products wherein virtually no scorch can be detected. Still further, the polymer/polyols of this invention may be used to form polyurethane elastomers in which relatively low molecular weight polyols must be used to provide the requisite stiffness. Also, polymer/polyols pursuant to this invention may be employed to form polyurethane products for applications where maximum load-bearing characteristics are required.

The following Examples are illustrative, but not in limitation of, the present invention.

DEFINITIONS

As used in the Examples appearing below, the following designations, symbols, terms and abbreviations have the indicated meanings:

"Theoretical molecular weight" of a polyol denotes a molecular weight calculated using the equation set forth previously based on the functionality of the starter used to produce the polyol and the experimentally determined hydroxyl number of the polyol.

"Molecular weights" of polyols are number average molecular weights.

"Triol" or "Diol" denotes the nominal functionality of a polyol based on the functionality of the starter.

Actual polyol functionalities are somewhat lower (3 to 20 percent lower) than with nominal functionality because of the presence of some amount of lower functionality material produced by side reactions. These side reactions are more significant the higher the molecular weight of the polyol being produced.

"Polyol I"—a polypropylene oxide diol produced from propylene oxide and dipropylene glycol and having a theoretical number average molecular weight of about 1000.

"Polyol II"—A propylene oxide diol produced from propylene oxide and dipropylene glycol and having a theoretical number average molecular weight of about 2000.

"Polyol III"—A polypropylene oxide triol produced from propylene oxide and glycerine and having a theoretical number average molecular weight of about 3000.

"Polyol IV"—A polyalkylene oxide triol produced from propylene and ethylene oxides and glycerine and having theoretical number average molecular weight of 5000. The alkylene oxide units are present primarily in blocks and the primary OH content is about 75 percent. The ethylene oxide is used to "cap" the triol. Based on its alkylene oxide content this triol contains 85 weight percent $C_3H_6O$ and 15 weight percent $C_2H_4O$.

"A/S" or "A:S" denotes the weight ratio of acrylonitrile to styrene.

"Calc" denotes calculated.

"cps" denotes centipoises.

"gm" denotes grams.

"hr" denotes hour.

"Parts" denotes parts by weight.

"Poly A" denotes polyacrylonitrile.

"Poly S" denotes polystyrene.

"ppm" denotes parts by weight per million parts by weight.

"wt-%" denotes percent by weight.

"VAZO-64" or "VAZO" denotes 2,2'-azo-bis-isobutyronitrile.

"%" denotes percentage by weight unless otherwise stated.

"Esperox 31M" denotes tertiary-butyl perpivalate.

"USP 245" denotes 2,5 dimethylhexane-2,5-diper 2-ethyl hexoate.

"Esperox 10" denotes tertiary-butyl perbenzoate.

"DTBPP" denotes di-t-butyl diperoxyphthalate.

"ESPEROX 33M" denotes ter.-butyl pernoedecanoate

FILTERABILITY

The preferred compositions of this invention are essentially free of polymer particles having diameters over 30 microns. A composition meets this criteria if over 99 weight percent of the composition passes successively through a 150-mesh screen and a 700 mesh screen in the following test. A 470 gram sample of the composition being tested is diluted with 940 grams of isopropanol to reduce viscosity effects. The diluted sample is passed through a 2.4 square inch 150 mesh screen and then through a 2.4 square inch 700 mesh screen. (The screens are cleaned, dried and weighed before the test.) Then the screens are washed with isopropanol to remove any polyol, dried and weighed. The difference between the final and initial screen weights corresponds to the amount of polymer that did not pass through the screens. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Mich.

EXAMPLE 1

To illustrate the relatively low acid number which can be achieved using the preferred peroxyester catalyst of the present invention, a polymer/polyol was prepared using a semi-batch process. To a 1-liter flask provided with a stirrer, thermometer, feed inlet, reflux condenser and nitrogen atmosphere, 320 grams of polyol IV was charged. This polyol was heated to 115° C. under nitrogen. Then, over a period of about 80 minutes, a mixture of 60 grams of acrylonitrile and 60 grams of styrene in 160 grams of polyol IV containing 18 micromoles of tertiary-butyl peroxy 2-ethylhexanoate initiator was added. The temperature was maintained at 115° C. during the addition and during a subsequent cookout of 40 minutes duration. The reaction product was then stripped at 100° C. and 1-5 mm. mercury pressure for four hours.

The resulting polymer/polyol had a viscosity (Brookfield) of 3350 cps at 25° C. and an acid number (mg. KOH per gm. sample) of 0.06.

EXAMPLE 2

For purposes of comparison, the semi-batch process of Example 1 was repeated to form a polymer/polyol using a "Vazo" catalyst. The resulting, stripped polymer/polyol had a viscosity of 2730 cps. at 25° C. and an acid number of 0.04.

EXAMPLE 3-16

These Examples illustrate the upper limits for forming preferred polymer/polyols using Polyol I and t-butyl peroxy 2-ethylhexoate. A continuous process was used in these Examples.

A tank reactor fitted with baffles and an impeller was used. The feed components were pumped to the reactor after going through an inlet mixer to assure complete mixing of the feed components before entering the reactor. The internal temperature of the reactor was controlled to within one degree Centigrade by controlled heating or cooling to the outside of the reactor. The product from the reactor flowed out of the reactor to a back pressure regulator adjusted to some positive back pressure and then through a water cooled tubular heat exchanger to a product receiver. Portions of the crude product were vacuum stripped at 2 millimeters pressure and 120° to 130° C. for testing.

The experimental conditions and results are tabulated in Table I below:

TABLE I

| Example | 3 | 4 | 5 | 6 | 7 | 8 | 9 | 10 |
|---|---|---|---|---|---|---|---|---|
| Monomer Content in Feed, Wt. % | 7.4 | 15.2 | 20.5 | 25.5 | 30.1 | 35.4 | 39.9 | 45.0 |
| Ratio of Acrylonitrile to Styrene | 80/20 | 80/20 | 80/20 | 80/20 | 80/20 | 80/20 | 80/20 | 80/20 |
| Reaction Temperature, °C. | 130 | 130 | 130 | 130 | 130 | 130 | 130 | 130 |
| Catalyst Concentration, wt. % in Feed | 0.6 | 0.5 | 0.5 | 0.5 | 0.5 | 0.5 | 0.5 | 0.5 |

TABLE I-continued

| | | | | | | | | |
|---|---|---|---|---|---|---|---|---|
| Polyol Feed Rate, gm/hr | 2542 | 2374 | 2210 | 2020 | 1972 | 1192 | 1107 | — |
| Monomer Feed Rate, gm/hr | 204 | 426 | 568 | 690 | 850 | 653 | 736 | — |
| Polymer in Product | | | | | | | | |
| By Calc. - Poly A, % | 4.4 | 9.4 | 13.1 | 18.0 | 21.9 | 26.1 | 29.8 | Reactor Plugged Run Not Completed |
| - Poly S, % | 1.2 | 2.8 | 3.8 | 4.9 | 6.0 | 7.0 | 8.0 | Reactor Plugged Run Not Completed |
| Total % | 5.6 | 12.2 | 16.9 | 22.9 | 27.9 | 33.1 | 37.8 | Reactor Plugged Run Not Completed |
| Product Properties | | | | | | | | Reactor Plugged Run Not Completed |
| Viscosity (Brookfield) at 25° C., cps. | 272 | 479 | 610 | 760 | 1034 | 2620 | 6620 | Reactor Plugged Run Not Completed |
| Filterability - % thru 700 Mesh | 100 | 100 | 100 | 100 | 100 | 100 | 100 | Reactor Plugged Run Not Completed |

| Example | 11 | 12 | 13 | 14 | 15 | 16 |
|---|---|---|---|---|---|---|
| Monomer Content in Feed, Wt. % | 19.8 | 12.4 | 12.4 | 17.7 | 21.7 | 12.4 |
| Ratio of Acrylonitrile in Styrene | 70/30 | 70/30 | 90/10 | 90/10 | 90/10 | 100/0 |
| Reaction Temperature, °C. | 130 | 130 | 130 | 130 | 130 | 125 |
| Catalyst Concentration, wt. % in Feed | 0.5 | 0.5 | 0.5 | 0.5 | 0.5 | 0.5 |
| Polyol Feed Rate, gm/hr | 2330 | 1748 | 1757 | 2274 | 2170 | 1755 |
| Monomer Feed Rate, gm/hr | 576 | 248 | 249 | 488 | 600 | 248 |
| Polymer in Product | | | | | | |
| By Calc. - Poly A, % | Reactor Plugged Run Not Completed | Reactor Plugged Run Not Completed | 7.6 | 12.0 | Reactor Plugged Run Not Completed | 9.1 |
| - Poly S, % | Reactor Plugged Run Not Completed | Reactor Plugged Run Not Completed | 1.1 | 1.6 | Reactor Plugged Run Not Completed | |
| Total % | Reactor Plugged Run Not Completed | Reactor Plugged Run Not Completed | 8.7 | 13.6 | Reactor Plugged Run Not Completed | 9.1 |
| Product Properties | Reactor Plugged Run Not Completed | Reactor Plugged Run Not Completed | | | Reactor Plugged Run Not Completed | |
| Viscosity (Brookfield) at 25° C., cps. | Reactor Plugged Run Not Completed | Reactor Plugged Run Not Completed | 302 | 378 | Reactor Plugged Run Not Completed | 390 |
| Filterability - % thru 700 Mesh | Reactor Plugged Run Not Completed | Reactor Plugged Run Not Completed | 100 | 100 | Reactor Plugged Run Not Completed | 36.5 |

The polymer contents (wt. % monomers in feed) and acrylonitrile to styrene ratios of the compositions of these Examples are set forth in FIG. 1. The numbers beside the data points refer to compositions produced in the correspondingly numbered Examples. Preferred polymer/polyols in accordance with this invention are identified by a square while products which do not meet the requisites of the preferred embodiment are denoted by a solid square.

An exclusion curve represented by a dotted line is set forth in the figure to define the boundary between preferred polymer/polyol compositions and those which do not pass the requisite filtration test. As will be appreciated, the exclusion curve should not be considered as a rigid boundary but, rather, as a reasonable guideline based upon the data included. As can be seen, a wide range of useful polymer/polyol compositions can be made even with this relatively low molecular weight polyol.

EXAMPLES 17-34

These Examples show the upper limits for forming preferred polymer/polyols using Polyol II and t-butyl peroxy 2-ethylhexoate.

The process used was the same as set forth in connection with Examples 3-16, and the experimental conditions and results are tabulated in Table II below.

TABLE II

| Example | 17 | 18 | 19 | 20 | 21 | 22 | 23 | 24 |
|---|---|---|---|---|---|---|---|---|
| Monomer Content in Feed, Wt. % | 12.7 | 16.5 | 20.9 | 25.3 | 16.6 | 20.3 | 25.1 | 25.5 |
| Ratio of Acrylonitrile to Styrene | 30/70 | 40/60 | 40/60 | 40/60 | 50/50 | 50/50 | 50/50 | 60/40 |
| Reaction Temperature, °C. | 130 | 130 | 130 | 130 | 130 | 130 | 130 | 130 |
| Catalyst Concentration, wt. % in Feed | 0.5 | 0.5 | 0.5 | 0.5 | 0.5 | 0.5 | 0.5 | 0.5 |
| Polyol Feed Rate, gm/hr | 1633 | 2336 | 2210 | 2090 | 2336 | 2206 | 2076 | 2072 |
| Monomer Feed Rate, gm/hr | 237 | 460 | 576 | 708 | 464 | 562 | 696 | 710 |
| Polymer in Product | | | | | | | | |
| By Calc. - Poly A, % | Reactor Plugged Run Not Completed | 4.9 | 6.3 | 9.2 | 6.8 | 8.5 | 10.8 | 13.4 |
| - Poly S, % | Reactor Plugged | 8.0 | 10.0 | 14.0 | 7.5 | 9.3 | 11.5 | 9.6 |

TABLE II-continued

| | | | | | | | | |
|---|---|---|---|---|---|---|---|---|
| Total % | Run Not Completed Reactor Plugged | 12.9 | 16.3 | 23.2 | 14.3 | 17.8 | 22.3 | 23.0 |
| Product Properties | Run Not Completed Reactor Plugged | | | | | | | |
| Viscosity (Brookfield) at 25° C., cps. | Run Not Completed Reactor Plugged | 1380 | 2960 | 18,000 | 910 | 1080 | 1536 | 1200 |
| Filterability - % thru 700 Mesh | Run Not Completed Reactor Plugged | 100 | 100 | 99.1 | 100 | 100 | 71.3 | 100 |

| Example | 25 | 26 | 27 | 28 | 29 | 30 | 31 | 32 |
|---|---|---|---|---|---|---|---|---|
| Monomer Content in Feed, Wt. % | 30.6 | 35.3 | 40.2 | 23.4 | 35.5 | 45.8 | 25.1 | 30.1 |
| Ratio of Acrylonitrile to Styrene | 60/40 | 60/40 | 60/40 | 80/20 | 80/20 | 80/20 | 90/10 | 90/10 |
| Reaction Temperature, °C. | 130 | 130 | 130 | 130 | 130 | 130 | 130 | 130 |
| Catalyst Concentration, wt. % in Feed | 0.5 | 0.5 | 0.5 | 0.6 | 0.5 | 0.5 | 0.5 | 0.5 |
| Polyol Feed Rate, gm/hr | 1926 | 1195 | 1117 | 2136 | 1202 | 750 | 2090 | 1936 |
| Monomer Feed Rate, gm/hr | 848 | 651 | 751 | 652 | 660 | 633 | 702 | 834 |
| Polymer in Product | | | | | | | | |
| By Calc. - Poly A, % | 16.7 | 19.8 | 22.8 | 17.4 | 26.7 | 35.5 | 20.3 | Reactor Plugged Run Not Completed |
| - Poly S, % | 12.0 | 14.0 | 16.1 | 4.5 | 7.0 | 9.2 | 2.5 | Reactor Plugged Run Not Completed |
| Total % | 28.7 | 33.8 | 38.9 | 21.9 | 33.7 | 44.7 | 22.8 | Reactor Plugged Run Not Completed |
| Product Properties | | | | | | | | Reactor Plugged Run Not Completed |
| Viscosity (Brookfield) at 25° C., cps. | 1624 | 3050 | 6670 | 912 | 2128 | 8000 | 1690 | Reactor Plugged Run Not Completed |
| Filterability - % thru 700 Mesh | 100 | 1.2 | 13.0 | 100 | 100 | 100 | 100 | Reactor Plugged Run Not Completed |

| Example | 33 | 34 |
|---|---|---|
| Monomer Content in Feed, Wt. % | 18.3 | 23.4 |
| Ratio of Acrylonitrile to Styrene | 100/0 | 100/0 |
| Reaction Temperature, °C. | 130 | 130 |
| Catalyst Concentration, wt. % in Feed | 0.5 | 0.5 |
| Polyol Feed Rate, gm/hr | 2276 | 2130 |
| Monomer Feed Rate, gm/hr | 508 | 650 |
| Polymer in Product | | |
| By Calc. - Poly A, % | 15.2 | 19.6 |
| - Poly S, % | | |
| Total % | 15.2 | 19.6 |
| Product Properties | | |
| Viscosity (Brookfield) at 25° C., cps. | 1014 | 1940 |
| Filterability - % thru 700 Mesh | 100 | 100 |

Figure 2:
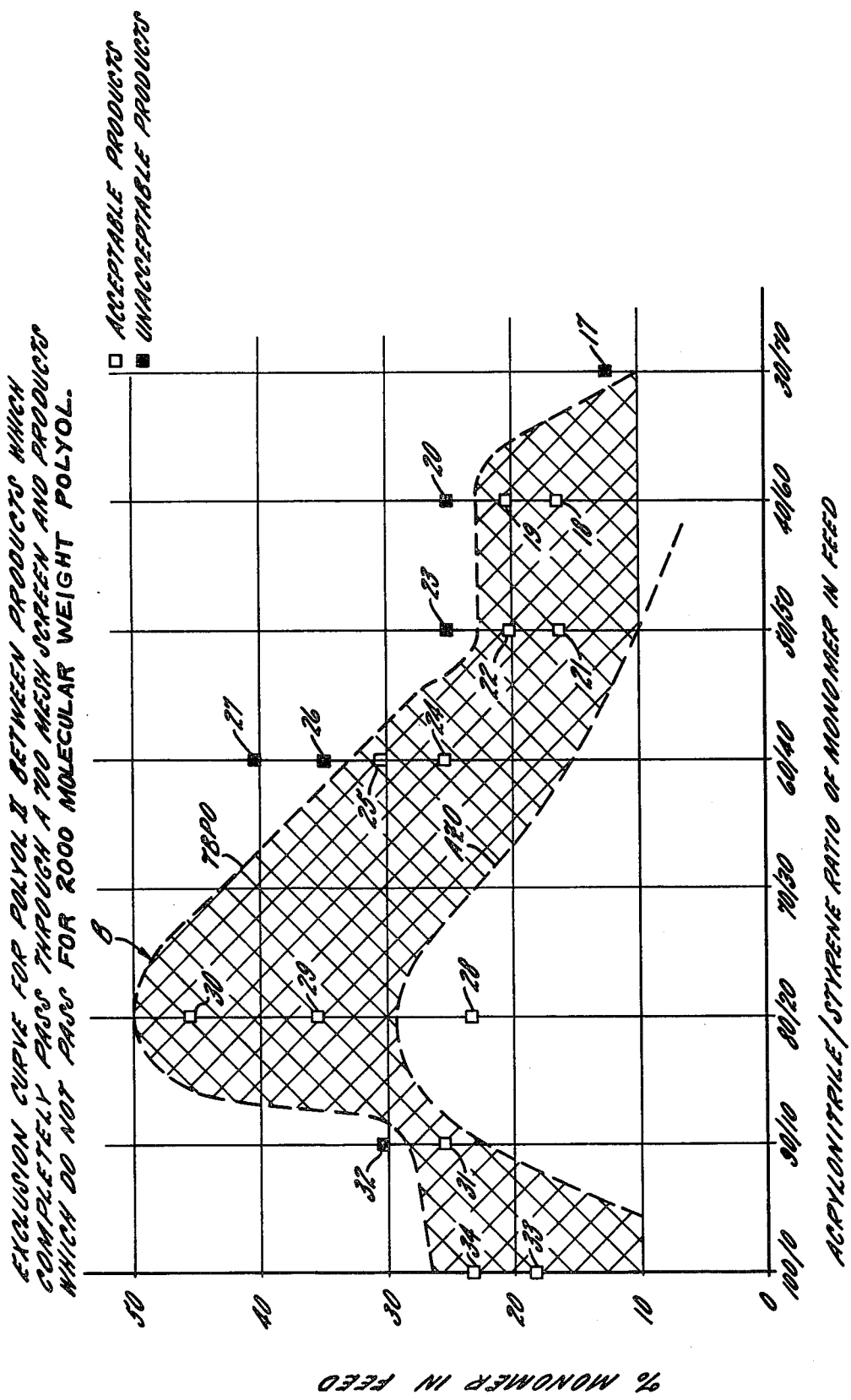
FIG. 2 is a graph similar to FIG. 1 for polymer/polyol compositions formed with a polyol (Polyol II) having a theoretical number average molecular weight of about 2,000 and further showing the distinction between use of an azo catalyst and a peroxyester catalyst according to the present invention.

FIG. 2 presents the data in graph form with the designations being the same as set forth in connection with FIG. 1. The upper dotted curve, denoted as "TBPO," comprises the exclusion curve for the preferred polymer/polyols of the present invention whereas the bottom curve, denoted as "AZO," provides an exclusion curve when the azo catalyst described in Example 2 is used.

As can be seen, the process of the present invention allows the formation of a wider range of polymer/polyol compositions which meet the filtration test than can be obtained through use of the azo catalyst under these conditions.

EXAMPLES 35-53

The upper limits for forming preferred polymer/polyols using Polyol III and t-butyl peroxy 2-ethylhexoate are set forth in these Examples.

The same process as described in Examples 3-16 was employed, with the experimental conditions and results being tabulated in Table III below.

TABLE III

| Example | 35 | 36 | 37 | 38 | 39 | 40 | 41 | 42 |
|---|---|---|---|---|---|---|---|---|
| Monomer Content in Feed, Wt. % | 20.2 | 17.5 | 20.4 | 20.2 | 20.2 | 23.0 | 23.4 | 27.3 |
| Ratio of acrylonitrile to Styrene | 20/80 | 30/70 | 30/70 | 35/65 | 40/60 | 40/60 | 40/60 | 40/60 |
| Reaction Temperature, °C. | 120 | 130 | 120 | 120 | 130 | 120 | 140 | 120 |
| Catalyst Concentration, wt. % in Feed | 0.4 | 0.5 | 0.4 | 0.4 | 0.5 | 0.4 | 0.5 | 0.4 |
| Polyol Feed Rate, gm/hr | Reactor Plugged Run Not Completed | 2288 | 2200 | 2210 | 2227 | 2162 | 2112 | 2028 |
| Monomer Feed Rate. gm/hr | Reactor Plugged Run Not Completed | 486 | 560 | 560 | 564 | 644 | 646 | 762 |
| Polymer in Product | | | | | | | | |
| By Calc. - Poly A, % | Reactor Plugged Run Not Completed | 4.5 | 5.2 | 5.9 | 7.4 | 8.0 | 8.4 | 9.7 |
| - Poly S, % | Reactor Plugged Run Not Completed | 10.3 | 11.0 | 10.8 | 11.0 | 12.0 | 13.1 | 14.9 |
| Total % | Reactor Plugged Run Not Completed | 14.8 | 16.2 | 16.7 | 18.4 | 20.0 | 21.5 | 24.6 |
| Product Properties | Reactor Plugged | | | | | | | |

TABLE III-continued

| | | | | | | | | |
|---|---|---|---|---|---|---|---|---|
| Viscosity (Brookfield) at 25° C., cps. | Run Not Completed Reactor Plugged | 4430 | 13,340 | 1840 | 1768 | 1588 | 7700 | 1965 |
| Filerability - % thru 700 Mesh | Run Not Completed Reactor Plugged | <5 | 100 | 37.8 | 100 | 11.8 | 100 | 3.3 |
| | Run Not Completed | | | | | | | |

| Example | 43 | 44 | 45 | 46 | 47 | 48 | 49 | 50 |
|---|---|---|---|---|---|---|---|---|
| Monomer Content in Feed, Wt. % | 20.4 | 19.2 | 23.0 | 27.2 | 25.6 | 30.2 | 40.3 | 23.2 |
| Ratio of Acrylonitrile to Styrene | 45/55 | 50/50 | 50/50 | 50/50 | 60/40 | 60/40 | 60/40 | 80/20 |
| Reaction Temperature, °C. | 120 | 120 | 120 | 120 | 130 | 130 | 130 | 140 |
| Catalyst Concentration, wt. % in Feed | 0.4 | 0.4 | 0.4 | 0.4 | 0.5 | 0.5 | 0.5 | 0.5 |
| Polyol Feed Rate, gm/hr | 2204 | 2252 | 2134 | 2010 | 2054 | 1906 | 1108 | 2174 |
| Monomer Feed Rate, gm/hr | 564 | 536 | 636 | 750 | 706 | 824 | 749 | 656 |
| Polymer in Product | | | | | | | | |
| By Calc. - Poly A, % | 7.5 | 8.5 | 10.1 | 12.0 | 14.0 | 16.6 | 22.8 | 17.1 |
| - Poly S, % | 9.7 | 8.8 | 10.4 | 12.9 | 9.9 | 11.9 | 16.1 | 4.5 |
| Total % | 17.2 | 17.3 | 20.5 | 24.9 | 23.9 | 28.5 | 38.9 | 21.6 |
| Product Properties | | | | | | | | |
| Viscosity (Brookfield) at 25° C., cps. | 1352 | 1285 | 1538 | 1892 | 1968 | 2444 | 6640 | 1408 |
| Filerability - % thru 700 Mesh | 100 | 100 | 53 | 4 | 100 | 100 | 83.6 | 100 |

| Example | 51 | 52 | 53 |
|---|---|---|---|
| Monomer Content in Feed, Wt. % | 45.6 | 25.0 | 25.3 |
| Ratio of Acrylonitrile to Styrene | 80/20 | 90/10 | 100/0 |
| Reaction Temperature, °C. | 130 | 130 | 130 |
| Catalyst Concentration, wt. % in Feed | 0.5 | 0.5 | 0.5 |
| Polyol Feed Rate. gm/hr | 757 | 2072 | 2068 |
| Monomer Feed Rate, gm/hr | 634 | 692 | 702 |
| Polymer in Product | | | |
| By calc. - Poly A, % | 35.3 | 20.1 | 21.1 |
| - Poly S, % | 9.1 | 2.5 | — |
| Total % | 44.4 | 22.6 | 21.1 |
| Product Properties | | | |
| Viscosity (Brookfield) at 25° C., cps. | 6350 | 1640 | 5730 |
| Filterability - % thru 700 Mesh | 100 | 26.8 | 100 |

Figure 3:
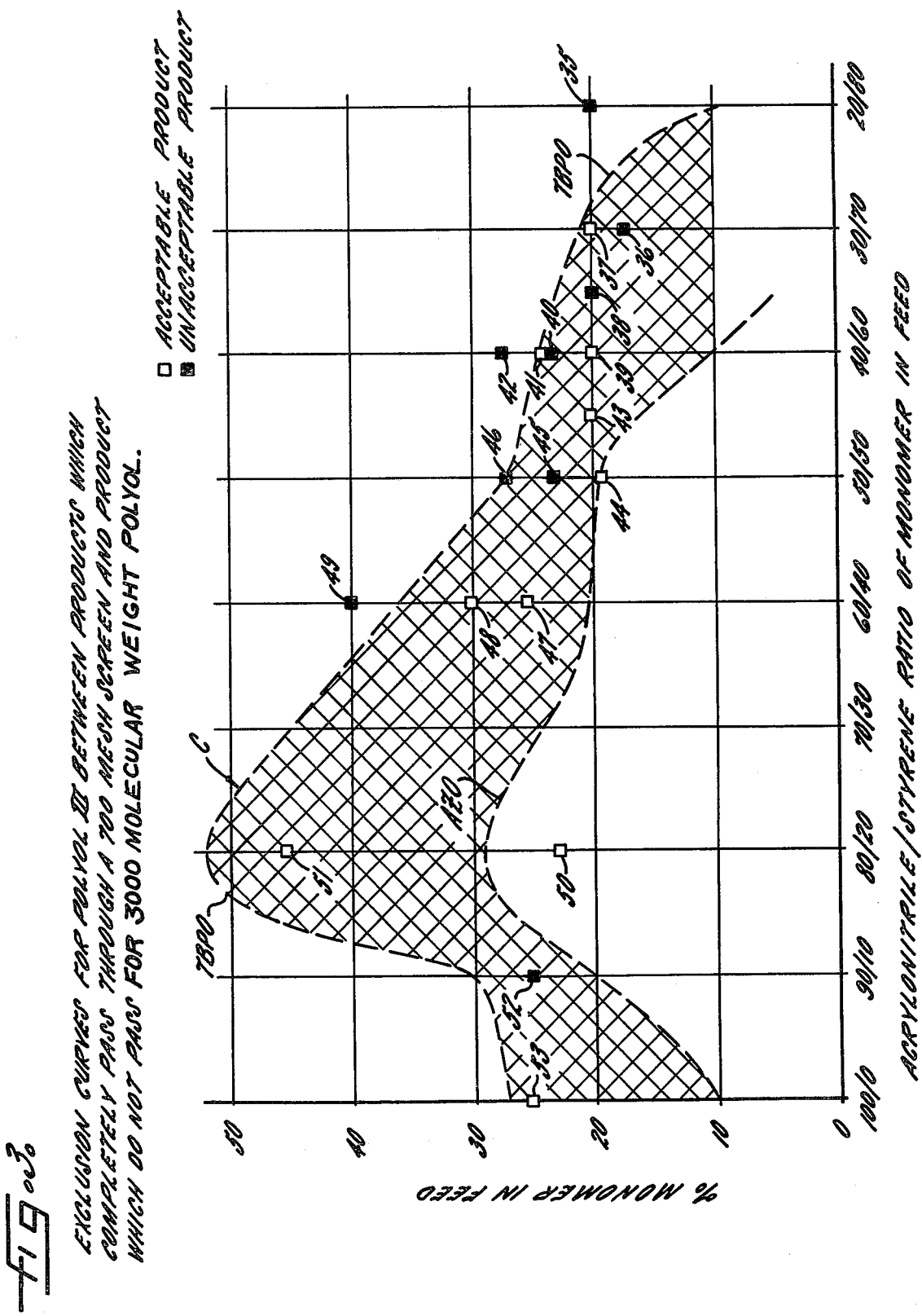
FIG. 3 is a graph similar to FIG. 2 for polymer/polyol compositions formed with a polyol (Polyol III) having a theoretical number average molecular weight of about 3,000.

FIG. 3 sets forth the data in graph form, with the designations being as previously described in connection with FIGS. 1 and 2. As can be seen, and as was the case with Polyol II, the use of the present invention allows formation of a wider range of polymer/polyol compositions than can be obtained with an azo catalyst under the conditions used. Particularly significant is the ability to form stable polymer/polyols at reasonable monomer contents with extremely low acrylonitrile/styrene ratios. Also, as can be seen by comparing Examples 36 and 38 with Example 37, the process conditions used such as temperature and catalyst concentration can shift the position of the exclusion curve somewhat.

EXAMPLES 54-69

These Examples illustrate the upper limits for forming preferred polymer/polyols with Polyol IV and t-butyl peroxy 2-ethylhexoate.

The process used was the same as set forth in Examples 3-16, and Table IV below presents the experimental conditions and results in tabular form.

TABLE IV

| Example | 54 | 55 | 56 | 57 | 58 | 59 | 60 | 61 |
|---|---|---|---|---|---|---|---|---|
| Monomer Content in Feed, Wt. % | 25.1 | 35.3 | 23.4 | 30.7 | 35.3 | 30.5 | 35.5 | 40.9 |
| Ratio of Acrylonitrile to Styrene | 30/70 | 30/70 | 40/60 | 40/60 | 40/60 | 50/50 | 50/50 | 50/50 |
| Reaction Temperature, °C. | 130 | 130 | 130 | 130 | 130 | 130 | 130 | 130 |
| Catalyst Concentration, wt. % in Feed | 0.5 | 0.5 | 0.5 | 0.5 | 0.5 | 0.5 | 0.5 | 0.5 |
| Polyol Feed Rate, gm/hr | 2076 | 1203 | 2143 | 1928 | 1193 | 1942 | 1199 | 1084 |
| Monomer Feed Rate, gm/hr | 696 | 656 | 654 | 852 | 652 | 852 | 657 | 749 |
| Polymer in Product | | | | | | | | |
| By Calc. - Poly A, % | 6.9 | 10.0 | 8.5 | 11.2 | 13.5 | 14.0 | 16.7 | 19.2 |
| - Poly S, % | 16.1 | 23.6 | 13.3 | 17.6 | 20.7 | 14.9 | 17.4 | 20.4 |
| Total % | 23.0 | 33.6 | 21.8 | 28.8 | 34.2 | 28.9 | 34.1 | 39.6 |
| Product Properties | | | | | | | | |
| Viscosity (Brookfield) at 25° C., cps. | 7060 | 25,750 | 2870 | 5230 | 9600 | 4100 | 7720 | 14,150 |
| Filerability - % thru 700 Mesh | 49.3 | 0.9 | 100 | 53.0 | 0.4 | 100 | 100 | 4.7 |

| Example | 62 | 63 | 64 | 65 | 66 | 67 | 68 | 69 |
|---|---|---|---|---|---|---|---|---|
| Monomer Content in Feed, Wt. % | 30.3 | 35.5 | 46.2 | 59.7 | 30.0 | 35.0 | 25.4 | 29.9 |
| Ratio of Acrylonitrile to Styrene | 60/40 | 70/30 | 70/30 | 80/20 | 90/10 | 90/10 | 100/0 | 100/0 |
| Reaction Temperature, °C. | 130 | 130 | 130 | 130 | 130 | 130 | 130 | 130 |
| Catalyst Concentration, wt. % in Feed | 0.5 | 0.5 | 0.5 | 0.5 | 0.5 | 0.5 | 0.5 | 0.5 |
| Polyol Feed Rate, gm/hr | 1944 | 1196 | 744 | Reactor Plugged Run Not Completed | 1944 | Reactor Plugged Run Not Completed | 2020 | 1956 |
| Monomer Feed Rate, gm/hr | 846 | 657 | 640 | Reactor Plugged Run Not Completed | 843 | Reactor Plugged Run No Completed | 686 | 834 |

TABLE IV-continued

| Polymer in Product | | | | | | | | |
|---|---|---|---|---|---|---|---|---|
| By Calc. - Poly A, % | 16.7 | 23.5 | 31.2 | Reactor Plugged Run Not Completed | 25.0 | Reactor Plugged Run Not Completed | 22.8 | Reactor Plugged Run Not Completed |
| - Poly S, % | 11.9 | 10.5 | 14.0 | Reactor Plugged Run Not Completed | 3.0 | Reactor Plugged Run Not Completed | — | Reactor Plugged Run Not Completed |
| Total % | 28.6 | 34.0 | 45.2 | Reactor Plugged Run Not Completed | 28.0 | Reactor Plugged Run Not Completed | 22.8 | Reactor Plugged Run Not Completed |
| Product Properties | | | | Reactor Plugged Run Not Completed | | Reactor Plugged Run Not Completed | | Reactor Plugged Run Not Completed |
| Viscosity (Brookfield at 25° C., cps. | 3910 | 5860 | 15,500 | Reactor Plugged Run Not Completed | 17,200 | Reactor Plugged Run Not Completed | 5940 | Reactor Plugged Run Not Completed |
| Filterability - % thru 700 Mesh | 100 | 100 | 4.7 | Reactor Plugged Run Not Completed | 100 | Reactor Plugged Run Not Completed | 100 | Reactor Plugged Run Not Completed |

Figure 4:
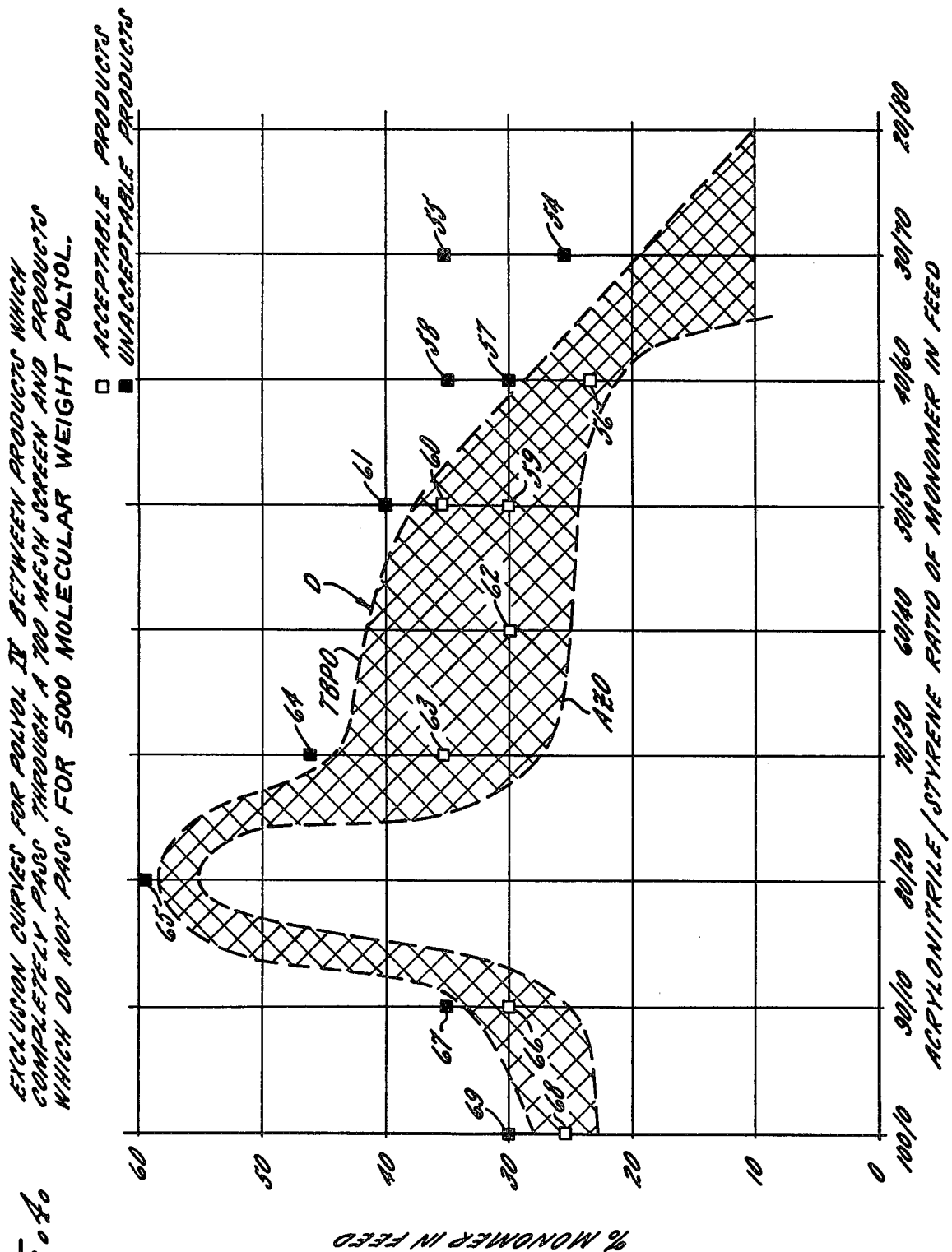
FIG. 4 is a graph similar to FIG. 2 for polymer/polyol compositions formed with a polyol (Polyol IV) having a theoretical number average molecular weight of 5,000.
Figure 5:
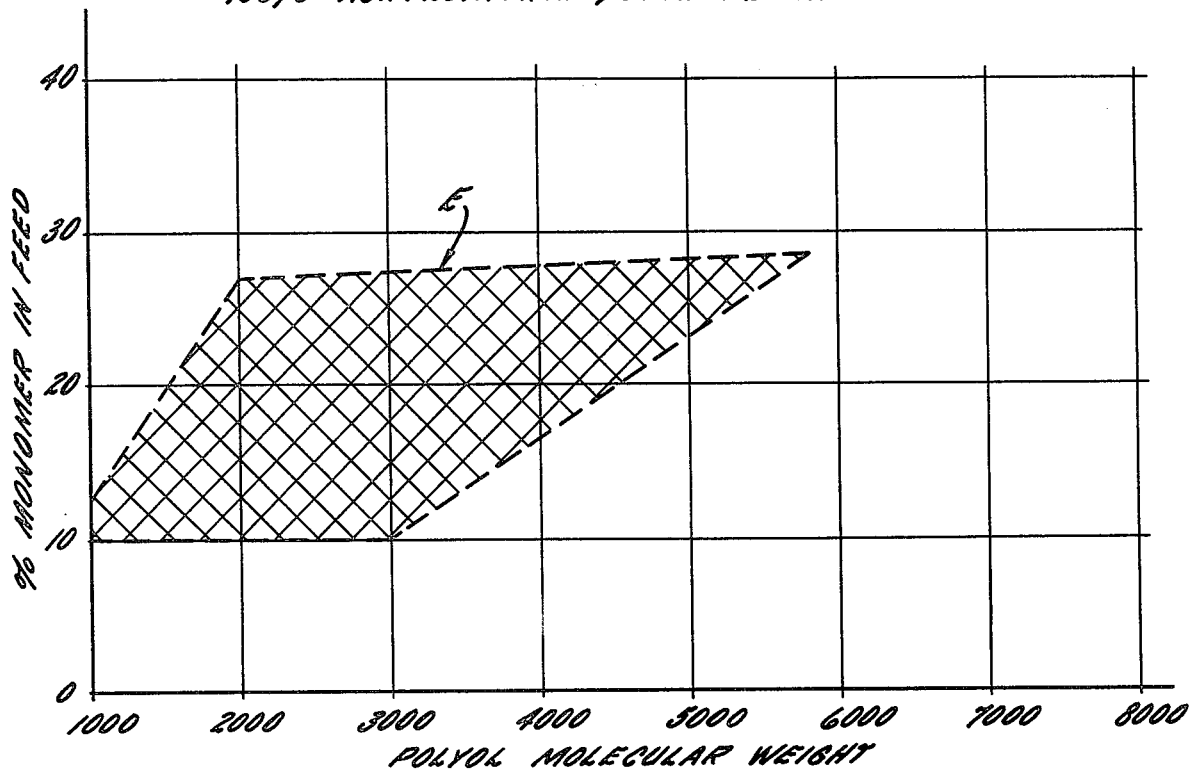
Figure 6:
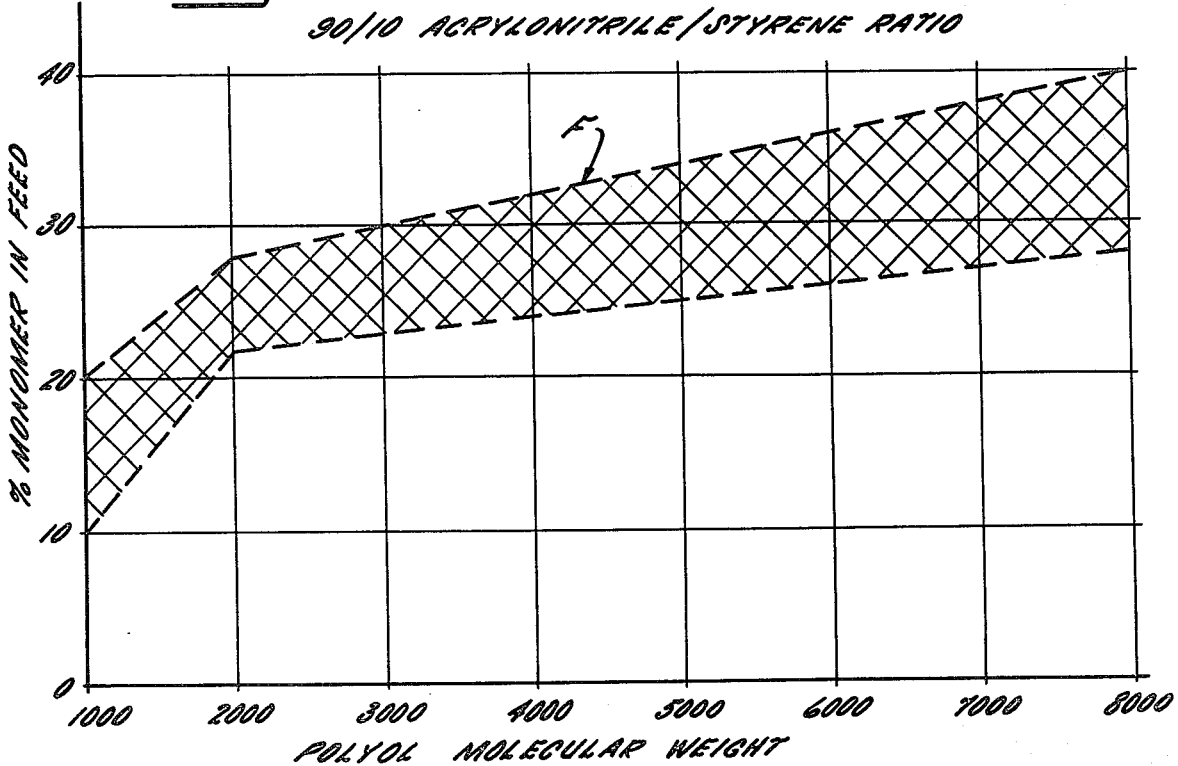
Figure 11:
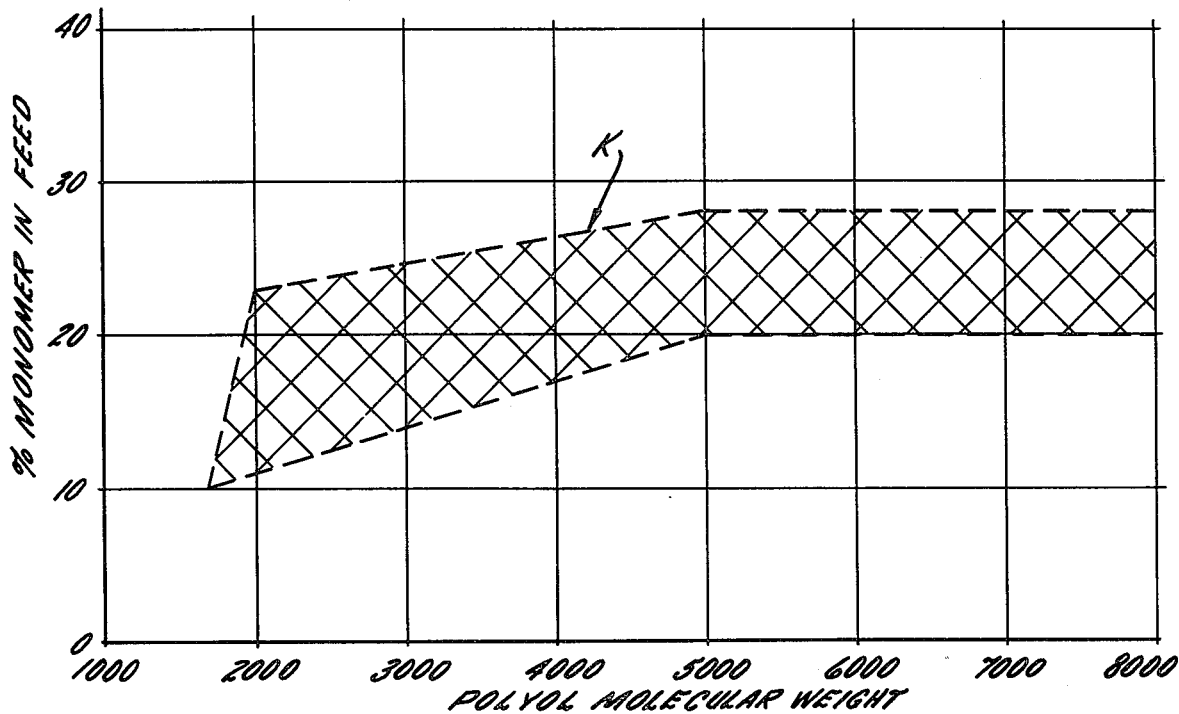
Figure 12:
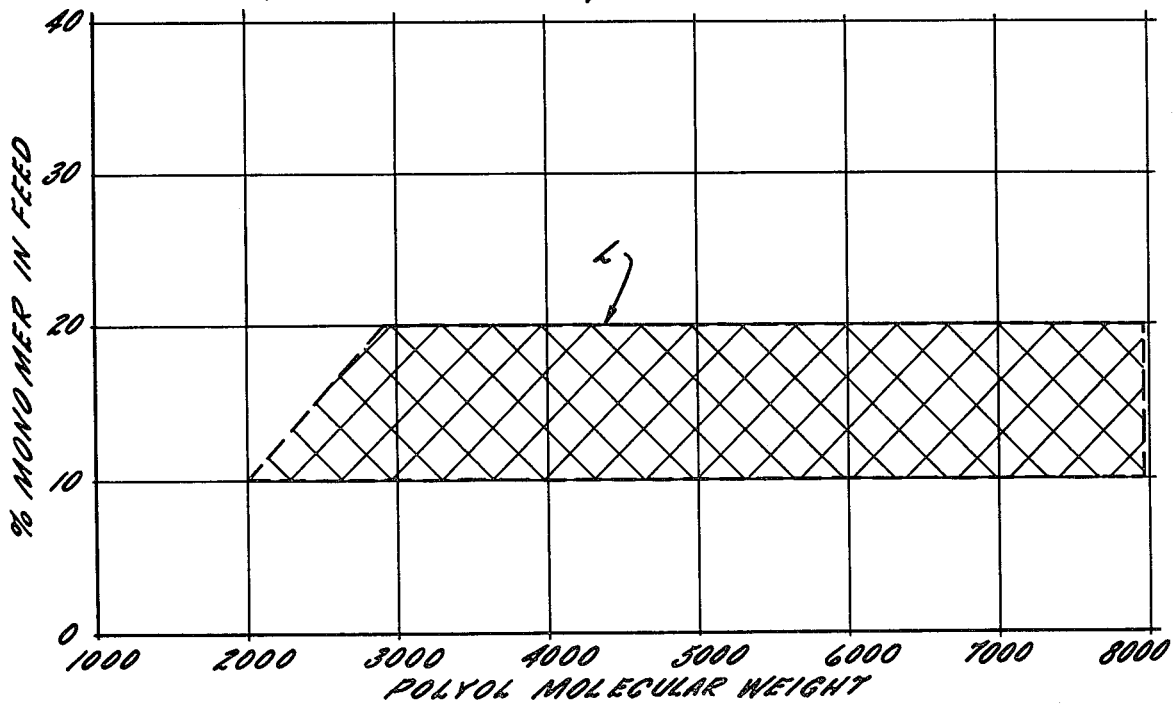
Figure 13:
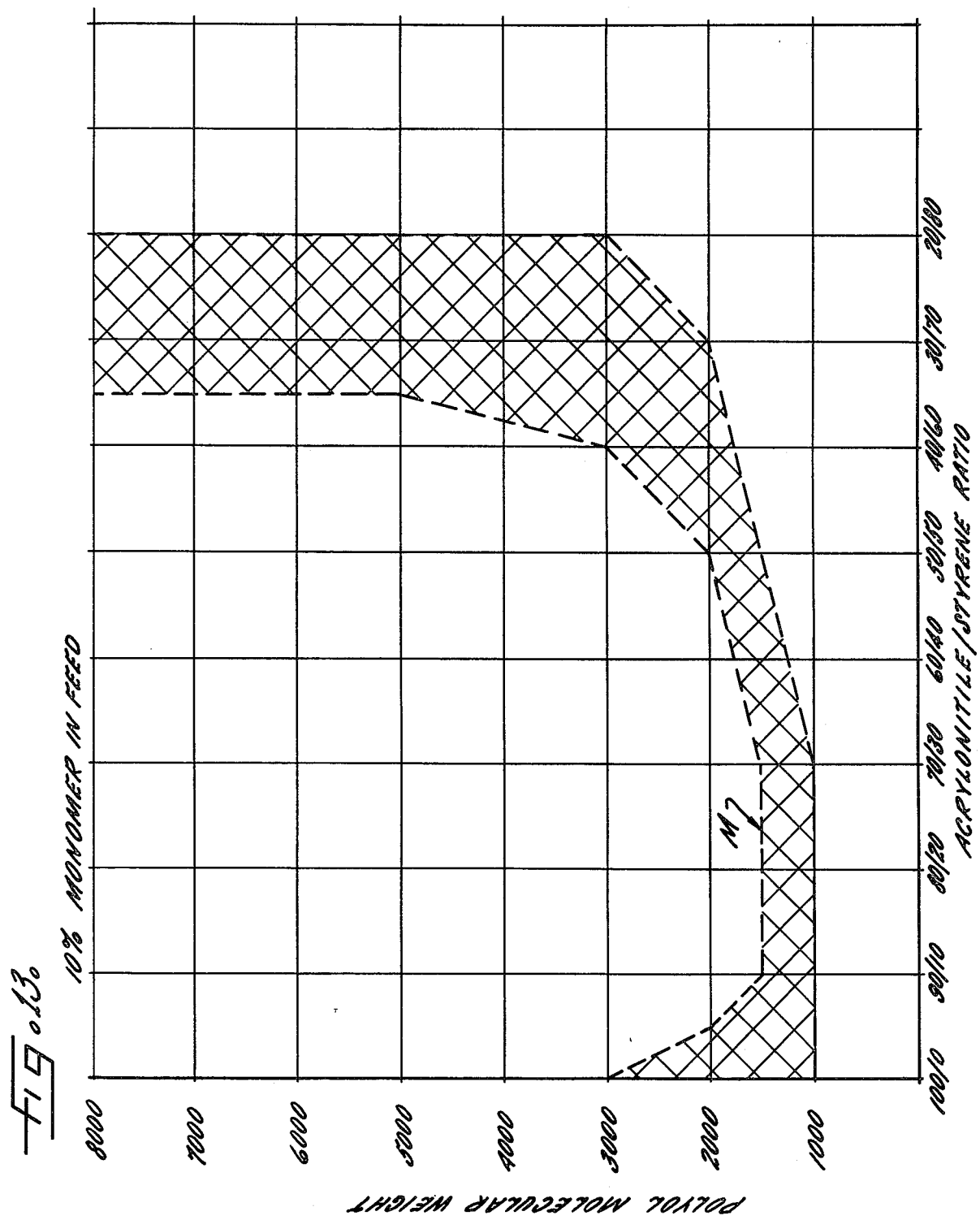
FIGS. 13 through 17 are graphs of the polyol molecular weight versus the acrylonitrile/styrene monomer ratios for monomer contents ranging from 10 to 50 weight percent and showing the preferred polymer/polyol compositions achieved using the present invention that cannot be formed with an azo catalyst. (at least when the continuous process described herein is employed).
Figure 14:
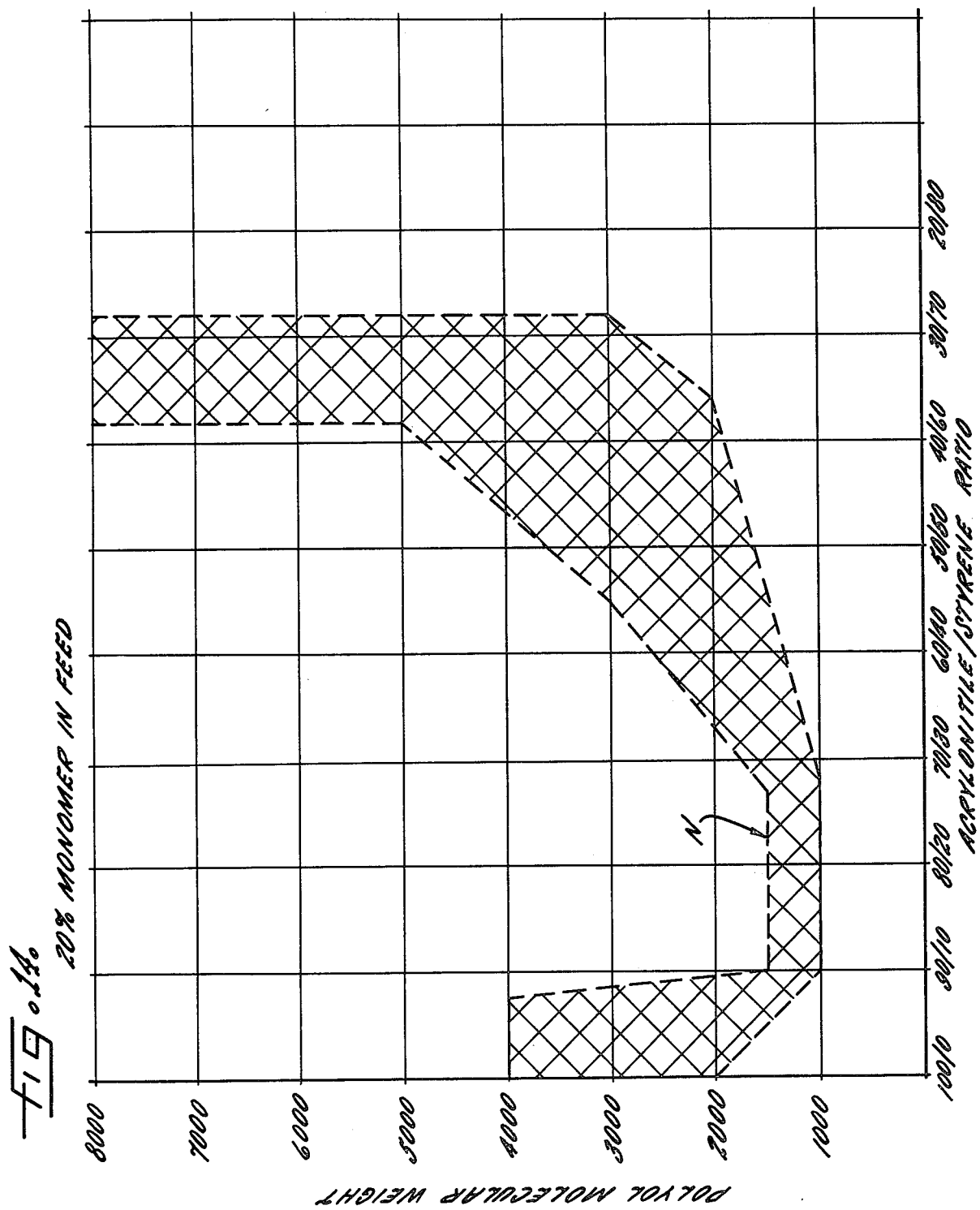
Figure 15:
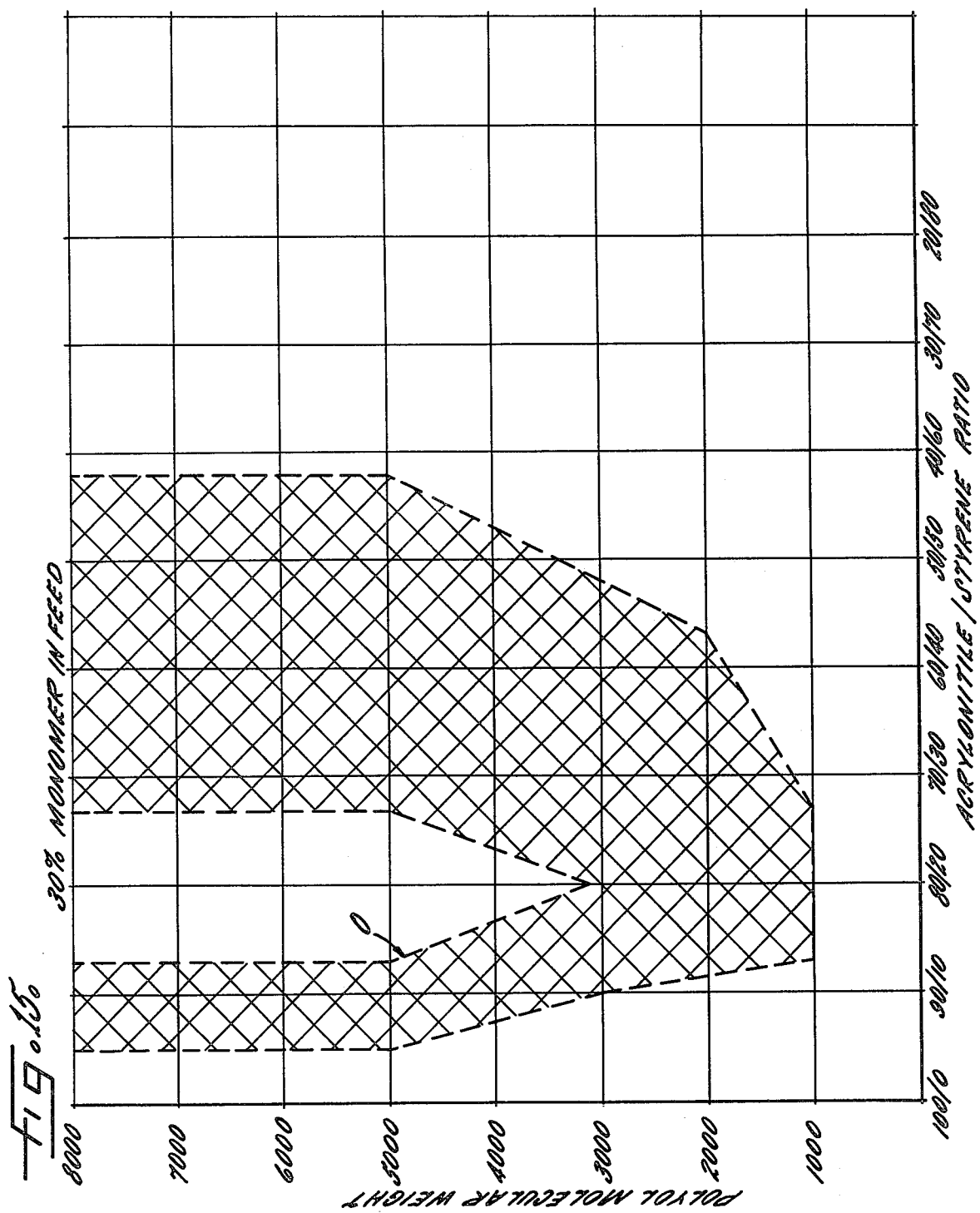
Figure 16:
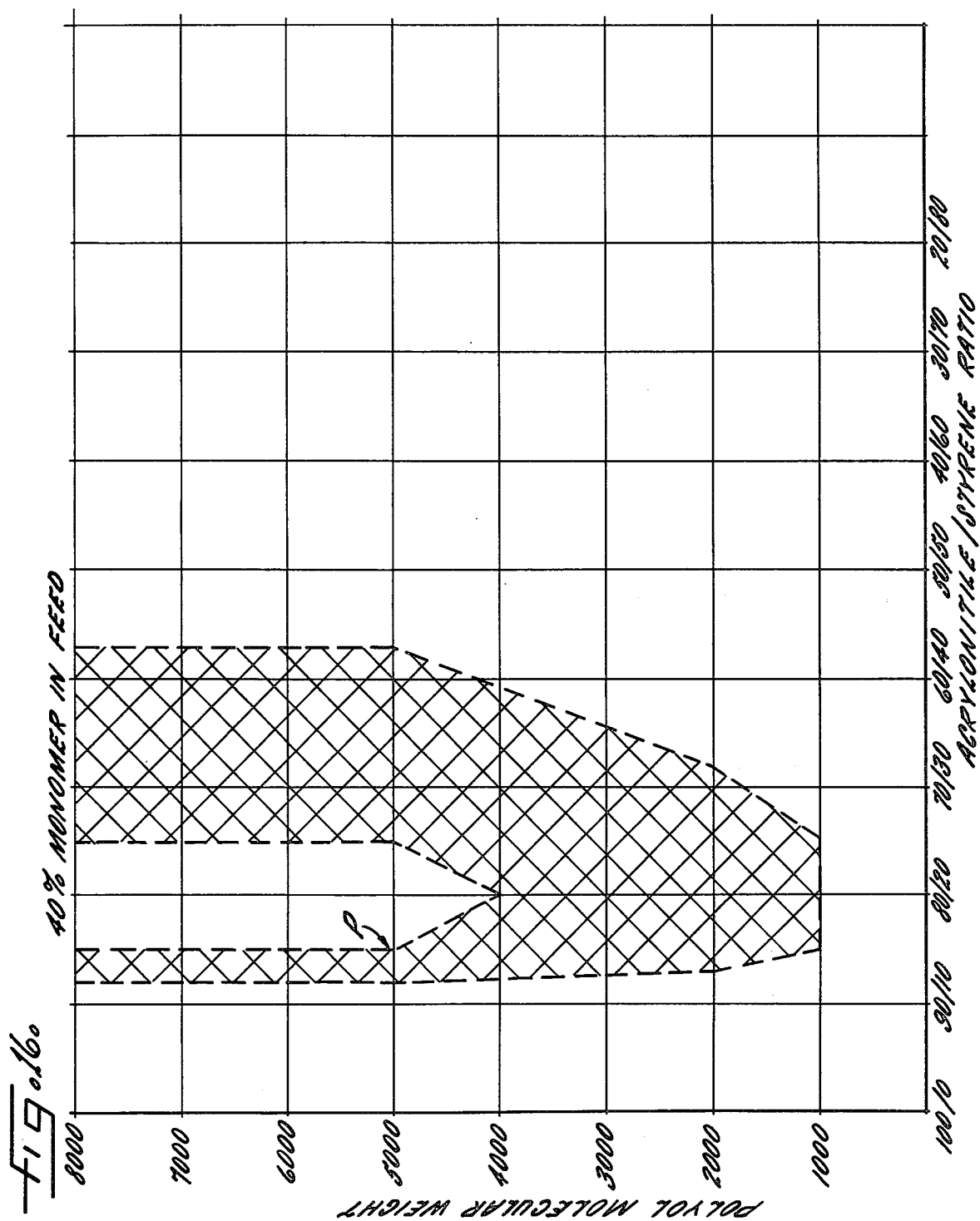
Figure 17:
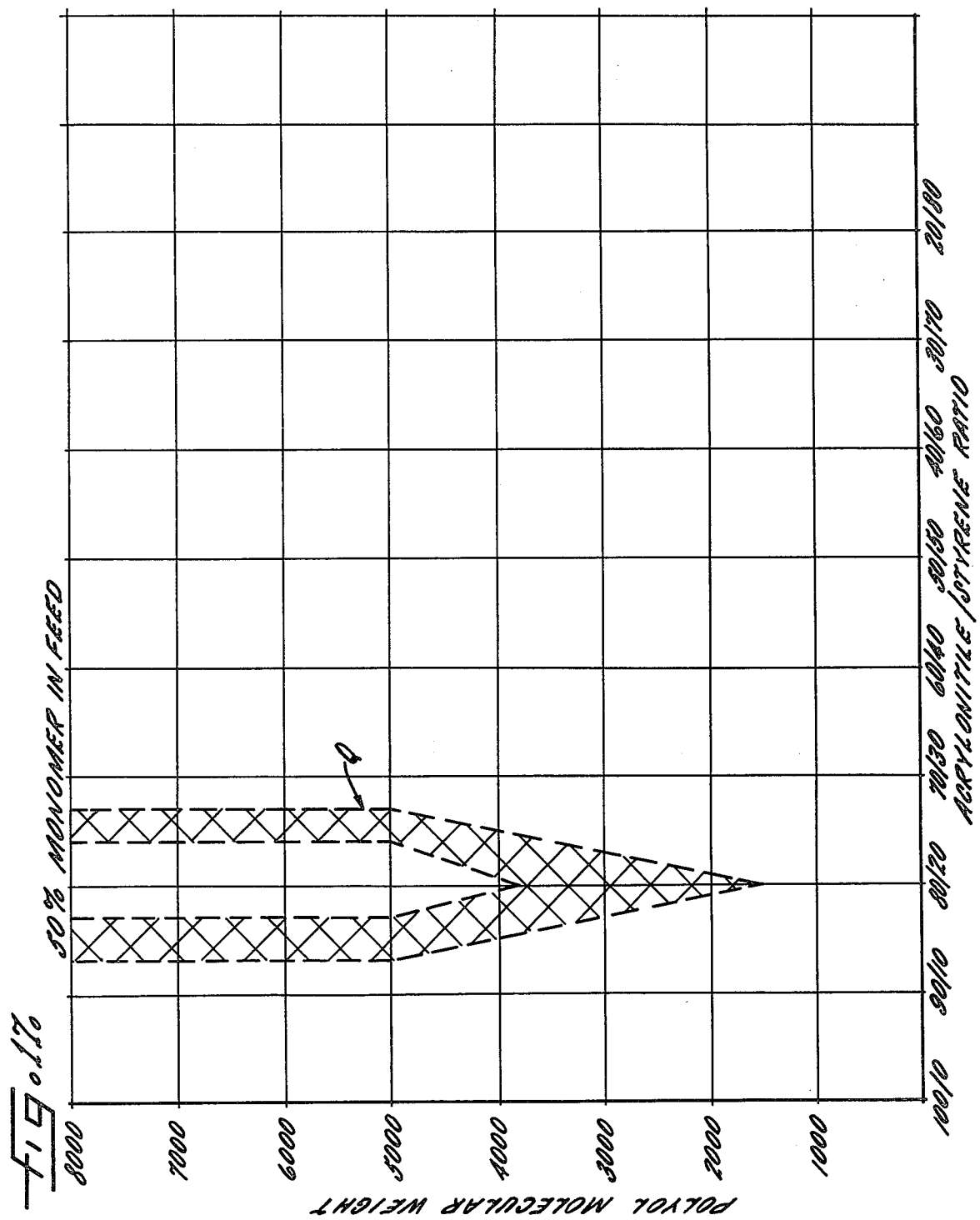

As can be seen in FIG. 4 (the designations being the same as previously described), the use of the present invention achieves formation of polymer/polyol compositions meeting the requisite filtration test that are unattainable with an azo catalyst under these conditions.

EXAMPLE 70

This Example shows the preparation of a stable polymer/polyol using t-butyl peroxy 2-ethylhexoate and a polypropylene oxide triol produced from propylene oxide and glycerine and having a theoretical number average molecular weight of about 1500. The experimental conditions and results are set forth below:

| | |
|---|---|
| Monomer content in feed, wt. % | 25.4 |
| Ratio of Acrylonitrile to Styrene | 80/20 |
| Reaction Temperature, °C. | 130 |
| Catalyst Concentration, wt. % in feed | 0.5 |
| Polyol feed rate, gm./hr | 2040 |
| Monomer feed rate, gm./hr | 694 |
| Polymer in Product | |
| By calc. - Poly A, % | 18.2 |
| - Poly X, % | 5.0 |
| Total % | 23.2 |
| Product Properties | |
| Viscosity (Brookfield) at 25° C. cps. | 960 |
| Filterability - % Thru 700 mesh | 100 |

EXAMPLES 71-75

These Examples illustrate the use of additional peroxyester catalyst species to form polymer/polyol compositions within the preferred embodiment of the present invention using Polyol III.

The experimental conditions and results are set forth in Table V below.

TABLE V

| Example | 71 | 72 | 73 | 74 | 75 |
|---|---|---|---|---|---|
| Monomer Content in Feed, Wt. % | 20.7 | 20.4 | 20.6 | 20.0 | 20.0 |
| Ratio of Acrylonitrile to Styrene | 40/60 | 40/60 | 40/60 | 40/60 | 40/60 |
| Reaction Temperature, °C. | 125 | 125 | 120 | 135 | 135 |
| Cataylst | Esperox 31 M | USP 245 | Esperox 33 M | Esperox 10 | DTBPP |
| Catalyst Concentration, Wt. % in Feed (net catalyst added) | 0.4 | 0.5 | 0.6 | 0.5 | 0.4 |
| Polyol Feed Rate, gm/hr | 2762 | 2754 | 2756 | 2204 | 2206 |
| Monomer Feed Rate, gm/hr | 576 | 564 | 572 | 552 | 554 |
| Polymer in Product | | | | | |
| By Calc. - Poly A, % | 6.9 | 7.2 | 6.8 | 6.7 | 6.3 |
| - Poly S, % | 11.0 | 11.2 | 10.9 | 10.5 | 10.5 |
| Total % | 17.9 | 18.4 | 17.7 | 17.2 | 16.8 |
| Product Properties | | | | | |
| Viscosity (Brookfield) at 25° C., cps. | 1214 | 1316 | 1186 | 7950 | 12,140 |
| Filterability - % thru 700 Mesh | 100 | 100 | 100 | 100 | 100 |

As can be seen, the resulting polymer/polyols passed the requisite filtration test, despite the relatively low acrylonitrile/styrene ratio.

What is claimed is:

1. A liquid polymer/polyol composition selected from the group consisting of:

A. a liquid polymer/polyol composition consisting essentially of: (1) from 40 to 90 weight percent of a polyoxypropylene polyol having a molecular weight from 1000 to 3000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, B. a liquid polymer/polyol composition consisting essentially of: (1) from 40 to 90 weight percent of a polyoxypropylene polyol having a molecular weight of at least 5000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, and C. a liquid polymer/polyol composition consisting essentially of: (1) from 40 to 90 weight percent of a polyoxxpropylene polyol having a molecular weight of at least 2000 and (2) from 60 to 10 weight percent of an acrylonitrile/styrene polymer wherein the acrylonitrile/styrene weight ratio is from 70/30 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture being such as to fall in a volume, said volume being characterized by areas A through Q of FIGS. 1 through 17, said composition as defined in A, B or C having been produced in the presence of a t-alkyl peroxyester free radical catalyst.

2. The liquid polymer/polyol composition as claimed claim 1 wherein the catalyst has the formula:

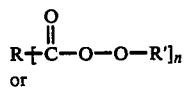

or

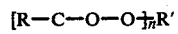

wherein n is 1 or 2, R' represents an alkyl group having from 4 to 20 carbon atoms, and the carbon atom or atoms adjacent the oxygen bond are tertiary, and R constitutes an alkyl group having from 3 to 12 carbon atoms or an aromatic group.

3. The liquid polymer/polyol composition of claim 1 wherein the catalyst is t-butyl peroxy-2-ethylhexanoate, t-butylperpivalate, 2- 5 dimethyl-hexane-2,5-di-per-2-ethyl hexoate, t-butylperneodecanoate, t-butylperbenzoate, or t-butylpercrotonate.

4. The liquid polymer/polyol composition of claim 1 wherein the catalyst is t-butyl peroxy 2-ethylhexoate.

5. The liquid polymer/polyol composition of claim 1 wherein the polymerization is conducted in a continuous operation while maintaining a low monomer to polyol ratio throughout the reaction mixture during the polymerization.

6. The liquid polymer/polyol composition of claim 1 having sufficient polymer particles with diameters of less than 30 microns to provide at least 50% filterability.

7. The liquid polymer/polyol composition of claim 1 having sufficient polymer particles with diameters of less than 30 microns to provide at least 99% filterability.

8. The liquid polymer/polyol composition of claim 1 wherein essentially all of the polymer particles have diameters less than 30 microns.

9. The liquid polymer/polyol composition of claim 1 wherein the acrylonitrile/styrene ratio is less than about 50/50.

10. The liquid polymer/polyol composition of part A of claim 1 wherein the polyol has a molecular weight in the range of from about 1000 to 2000.

11. The liquid polymer/polyol composition of part A of claim 1 wherein the acrylonitrile/styrene ratio is from about 30/70 to 50/50.

12. The liquid polymer/polyol composition of part B of claim 1 wherein the molecular weight of the polyol is from 5000 to 8000.

13. A liquid polymer/polyol composition consisting essentially of: (1) from 40 to 90 weight percent of a polyoxypropylene polyol having a molecular weight from 1000 to 3000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, said composition having been produced in the presence of a t-alkyl peroxyester free radical catalyst.

14. A liquid polymer/polyol composition consisting essentially of: (1) from 40 to 90 weight percent of a polyoxypropylene polyol having a molecular weight of at least 5000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, said composition having been produced in the presence of a t-alkyl peroxyester free radical catalyst.

15. A liquid polymer/polyol composition consisting essentially of: (1) from 40 to 90 weight percent of a polyoxypropylene polyol having a molecular weight of at least 2000 and (2) from 60 to 10 weight percent of an acrylonitrile/styrene polymer wherein the acrylonitrile/styrene weight ratio is from 70/30 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by area A through Q of FIGS. 1 through 17, said composition having been produced in the presence of a t-alkyl peroxyester free radical catalyst.

16. A liquid polymer/polyol composition selected from the group consisting of:
   A. a liquid polymer/polyol composition consisting essentially of: (1) from 40 to 90 weight percent of a polyoxypropylene polyol having a molecular weight from 1000 to 3000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17,
   B. a liquid polymer/polyol composition consisting essentially of: (1) from 40 to 90 weight percent of a polyoxypropylene polyol having a molecular weight of at least 5000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17; and
   C. a liquid polymer/polyol composition consisting essentially of: (1) from 40 to 90 weight percent of a polyoxypropylene polyol having a molecular weight of at least 2000 and (2) from 60 to 10 weight percent of an acrylonitrile/styrene polymer wherein the acrylonitrile/styrene weight ratio is from 70/30 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, the polyol in A, B, and C being a member selected from the group of polyols consisting of the propylene oxide or propylene oxide and ethylene oxide adducts of polyhydroxy alkanes.

17. The liquid polymer/polyol composition of claim 16 having sufficient polymer particles with diameters of less than 30 microns to provide at least 50% filterability.

18. The liquid polymer/polyol composition of claim 16 having sufficient polymer particles with diameters of less than 30 microns to provide at least 99% filterability.

19. The liquid polymer/polyol composition of claim 16 wherein essentially all of the polymer particles have diameters less than 30 microns.

20. The liquid polymer/polyol composition of claim 16 wherein the acrylonitrile/styrene ratio is less than about 50/50.

21. The liquid polymer/polyol composition of claim 16 wherein the polymerization is conducted in a continuous operation, in the presence of a t-alkyl peroxyester free radical catalyst and while maintaining a low monomer to polyol ratio throughout the reaction mixture during the polymerization.

22. The liquid polymer/polyol composition of claim 21 wherein the peroxyester catalyst is t-butyl peroxy 2-ethylhexoate.

23. The liquid polymer/polyol composition of part A of claim 16 wherein the polyol has a molecular weight in the range of from about 1000 to 2000.

24. The liquid polymer/polyol composition of part A of claim 16 wherein the acrylonitrile/styrene ratio is from about 30/70 to 50/50.

25. The liquid polymer/polyol composition of part B of claim 16 wherein the molecular weight of the polyol is from 5000 to 8000.

26. A liquid polymer/polyol composition consisting essentially of: (1) from 40 to 90 weight percent of a polyoxypropylene polyol having a molecular weight from 1000 to 3000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, said polyol consisting of a propylene oxide or a propylene oxide and ethylene oxide adduct of a polyhydorxyalkane.

27. A liquid polymer/polyol composition consisting essentially of: (1) from 40 to 90 weight percent of a polyoxypropylene polyol having a molecular weight of at least 5000 and (2) from 60 to 10 weight percent of an acrylonitrile/styrene polymer wherein the acrylonitrile/styrene weight ratio is from 100/0 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weights of the monomer mixture (based on weights of the monomer mixture being such as to fall in a volume, said volume being characterized by areas A through Q of FIGS. 1 through 17, said polyol consisting of a propylene oxide or a propylene oxide and ethylene oxide adduct of a polyhydroxyalkane.

28. A liquid polymer/polyol composition consisting essentially of: (1) from 40 to 90 weight percent of a polyoxypropylene polyol having a molecular weight of at least 2000 and (2) from 60 to 10 weight percent of an acrylonitrile/styrene polymer wherein the acrylonitrile/styrene weight ratio is from 70/30 to 20/80, said polymer being in the form of particles that are stably dispersed in the polyol, said composition having sufficient polymer particles with diameters of less than 30 microns to provide at least 20% filterability, said composition having been produced by polymerizing a monomer mixture of acrylonitrile and styrene in the polyol, the polyol molecular weight, the weight percent of the monomer mixture (based on weights of the monomer mixture and the polyol) and the acrylonitrile/styrene ratio in the monomer mixture being such as to fall in a volume, said volume being characterized by areas A through Q of FIGS. 1 through 17, said polyol consisting of a propylene oxide or a propylene oxide and ethylene oxide adduct of a polyhydroxyalkane.

* * * * *